United States Patent

Kunimatsu

(10) Patent No.: US 9,131,563 B2
(45) Date of Patent: Sep. 8, 2015

(54) LIGHT-EMITTING DIODE DRIVING APPARATUS AND SEMICONDUCTOR DEVICE

(71) Applicant: Panasonic Intellectual Property Management Co., Ltd., Osaka (JP)

(72) Inventor: Takashi Kunimatsu, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/551,655

(22) Filed: Nov. 24, 2014

(65) Prior Publication Data

US 2015/0077009 A1 Mar. 19, 2015

Related U.S. Application Data

(63) Continuation of application No. PCT/JP2013/002778, filed on Apr. 24, 2013.

(30) Foreign Application Priority Data

May 28, 2012 (JP) ................................. 2012-120440

(51) Int. Cl.
*H05B 37/00* (2006.01)
*H05B 33/08* (2006.01)
*H02M 1/42* (2007.01)

(52) U.S. Cl.
CPC ........ *H05B 33/0809* (2013.01); *H05B 33/0815* (2013.01); *H02M 2001/4291* (2013.01); *Y02B 70/126* (2013.01)

(58) Field of Classification Search
None
See application file for complete search history.

(56) References Cited

U.S. PATENT DOCUMENTS

| | | | |
|---|---|---|---|
| 7,102,340 B1* | 9/2006 | Ferguson | 323/284 |
| 7,915,836 B2 | 3/2011 | Cheng | |
| 8,102,683 B2 | 1/2012 | Gaknoki et al. | |
| 8,242,765 B2* | 8/2012 | Kunimatsu | 323/285 |
| 8,593,067 B2 | 11/2013 | Iwai et al. | |
| 2008/0224625 A1* | 9/2008 | Greenfeld | 315/201 |
| 2010/0060190 A1 | 3/2010 | Cheng | |

(Continued)

FOREIGN PATENT DOCUMENTS

| | | |
|---|---|---|
| JP | 2004-327152 A | 11/2004 |
| JP | 2010-062515 A | 3/2010 |
| JP | 2011-014348 A | 1/2011 |
| JP | 2011-154860 A | 8/2011 |

OTHER PUBLICATIONS

International Search Report issued in PCT/JP2013/002778, dated Jun. 11, 2013, with English translation.

*Primary Examiner* — Jany Richardson
(74) *Attorney, Agent, or Firm* — McDermott Will & Emery LLP

(57) ABSTRACT

Provided is a light-emitting diode driving apparatus including: a rectifying circuit; a switching element; a choke coil; an output current sensing circuit; an LED light source; a rectifier diode; a control circuit; a feedback sensing circuit; an input voltage sensing circuit; and a conduction time counting circuit, wherein the feedback sensing circuit outputs a feedback dummy current to the output current sensing circuit, the conduction time counting circuit adjusts the feedback dummy current, the feedback sensing circuit outputs to the control circuit a control signal which controls switching of the switching element in response to a signal based on an error between an output feedback signal and a feedback dummy signal generated by the feedback dummy current.

24 Claims, 13 Drawing Sheets

(56) References Cited

U.S. PATENT DOCUMENTS

| | | | |
|---|---|---|---|
| 2011/0109230 A1* | 5/2011 | Simi | 315/119 |
| 2011/0181198 A1 | 7/2011 | Iwai et al. | |
| 2011/0194311 A1 | 8/2011 | Gaknoki et al. | |
| 2013/0134884 A1* | 5/2013 | Nakajo et al. | 315/122 |
| 2013/0181626 A1* | 7/2013 | Chen | 315/200 R |

* cited by examiner

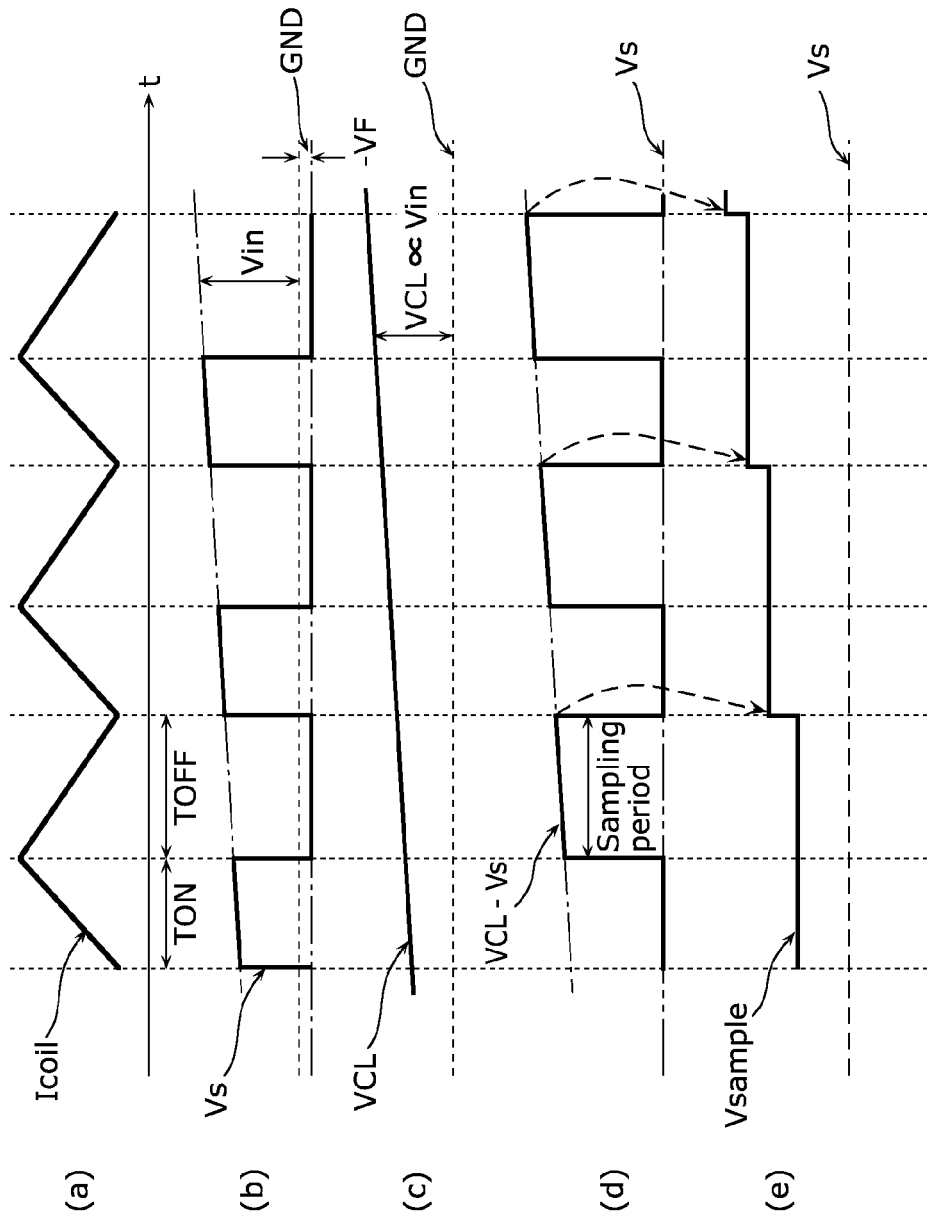

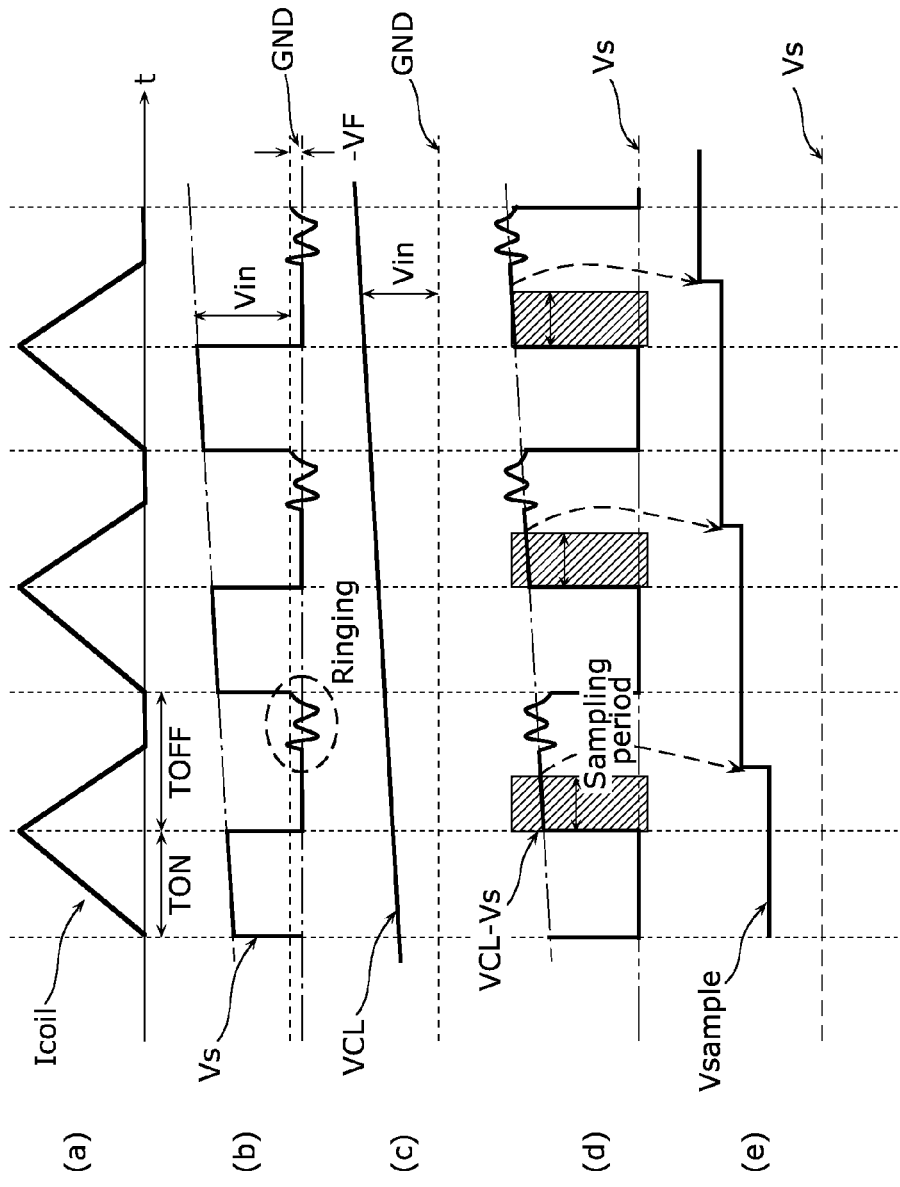

LIGHT-EMITTING DIODE DRIVING APPARATUS AND SEMICONDUCTOR DEVICE

CROSS REFERENCE TO RELATED APPLICATIONS

This is a continuation application of PCT International Application No. PCT/JP2013/002778 filed on Apr. 24, 2013, designating the United States of America, which is based on and claims priority of Japanese Patent Application No. 2012-120440 filed on May 28, 2012. The entire disclosures of the above-identified applications, including the specifications, drawings and claims are incorporated herein by reference in their entirety.

FIELD

The present invention relates to light-emitting diode driving apparatuses and semiconductor devices, and, in particular, to a semiconductor device for turning on a light-emitting diode used for illumination, and a light-emitting diode driving apparatus using the same, and a configuration for achieving dimming control using an existing phase control dimmer in exchanging a lighting device using an incandescent lamp with a lighting device using a light-emitting diode.

BACKGROUND

Conventionally, phase control dimmers are known which, to provide the dimming control for incandescent bulbs, turns on a switching element (generally, a triac device) at a certain phase angle of an AC supply voltage to readily supply power to incandescent loads with use of one volume resistor element.

In recent years, light-emitting diode driving semiconductor devices for driving a light-emitting diode (hereinafter, referred to as an LED) and light-emitting diode driving apparatuses having the same are developed and put in practical use. In particular, a large volume of lighting devices, such as an LED bulb having a white LED as a light source, are manufactured.

Additionally, of light-emitting diode driving apparatuses, various lighting devices accommodating a phase control dimmer for dimming an incandescent bulb are proposed (e.g., see Patent Literatures (PTLs) 1, 2).

A conventional light-emitting diode driving apparatus disclosed in PTL 1 is in a non-isolated flyback converter circuit structure, and detects a phase angle of a triac having an input pulsating waveform (a time in a zero-crossing state and a half-line cycle time) to adjust a reference signal from a feedback reference circuit. Then, the conventional light-emitting diode driving apparatus controls an LED current in response to the reference signal during the next half-line cycle.

A conventional light-emitting diode driving apparatus disclosed in PTL 2 has a buck converter in which a switching element is disposed on a high side of an input voltage, namely, a "high-side buck converter."

In general, a buck converter, as compared with a flyback converter, uses a coil rather than a transformer, as an energy conversion circuit. This yields less energy conversion loss at a transformer, producing good conversion efficiency.

Moreover, in the case of a buck converter, the LED current is the same as a coil current and flows during both periods where a switching element is turned on and off. As a result, if amounts of the current in the switching element are the same in the flyback converter and the buck converter, an LED average current is greater in the buck converter, as shown in (b), than the flyback converter. To construct a non-isolated circuit, the use of a buck converter is advantageous in efficiency or cost, as compared with a flyback converter.

CITATION LIST

Patent Literature

[PTL 1] U.S. Pat. No. 8,102,683
[PTL 2] Japanese Unexamined Patent Application Publication No. 2011-14348

SUMMARY

Technical Problem

In the conventional light-emitting diode driving apparatus disclosed in PTL 1, a feedback signal UFB which is voltage information proportional to a current through an LED represents a feedback signal. The feedback signal UFB is a potential difference which is attributed to a current through a sense resistor and relative to reference potentials of a controller and the switching element. Thus, the feedback signal UFB is always a positive signal relative to the reference potentials of the controller and the switching element. However, if the control circuit structure is maintained, such a problem arises that the conventional light-emitting diode driving apparatus is not applicable to a buck converter that has good energy conversion efficiency.

In the method of use that does not require the dimming control, if an input voltage is smoothed without connection of a dimmer, the conventional light-emitting diode driving apparatus detects a period between zero-crossings to adjust a reference signal from the feedback reference circuit at the smoothed level to control an output current. Thus, if the input voltage is a smoothed voltage, the conventional light-emitting diode driving apparatus cannot detect the period between zero-crossings, and is, thus, unable to adjust the reference signal and control the output current.

In the conventional light-emitting diode driving apparatus disclosed in PTL 2, a current through an LED light source is sensed across a current sensing resistor to introduce a feedback signal which is a positive signal relative to a reference voltage of a control circuit. The circuit structure includes, on the high-side of the input voltage, a driver circuit for driving the switching element, to construct a buck converter.

However, the switching element and the control circuit, which provides control over switching of the switching element, have different reference potentials. Thus, to exchange signals over different reference voltages, a dedicated driver circuit is required.

Additionally, a smoothing circuit is necessary for smoothing the input voltage to a lighting circuit after the detection of the conduction angle of a pulsating waveform. This ends up with power factor degradation.

In light of the conventional problems described above, a light-emitting diode driving apparatus and semiconductor device are provided which allow constant current control and the dimming control if the input voltage has a phase controlled pulsating waveform, and allow the constant current control if the input voltage is smoothed.

Solution to Problem

To achieve the above object, the light-emitting diode driving apparatus according to the present invention is a light-emitting diode driving apparatus including: a rectifying circuit which rectifies an AC voltage input from an AC power source, to output a DC voltage; a switching element having an input terminal connected to a high side of the rectifying circuit, which turns on and off the DC voltage; a choke coil having one end connected to an output terminal of the switching element; an output current sensing circuit connected between the output terminal of the switching element and the one end of the choke coil, for sensing a current through the choke coil; an LED light source which includes one or more light-emitting diodes each having an anode terminal connected to another end of the choke coil and a cathode terminal connected to a low side of the rectifying circuit; a rectifier diode having an anode terminal connected to the low side of the rectifying circuit and a cathode terminal connected to the output terminal of the switching element, the rectifier diode supplying the LED light source with counter electromotive force developed in the choke coil; a control circuit which outputs a drive signal that controls on and off operation of the switching element, based on an operation reference voltage which is a voltage at a same potential as a node between the output terminal of the switching element and the cathode terminal of the rectifier diode; a feedback sensing circuit connected to the output current sensing circuit, for receiving an output feedback signal output from the output current sensing circuit; an input voltage sensing circuit which senses input voltage information rectified by the rectifying circuit; and a conduction time counting circuit which counts a switching grant period signal output from the input voltage sensing circuit, wherein the feedback sensing circuit outputs a feedback dummy current to the output current sensing circuit, the conduction time counting circuit adjusts the feedback dummy current to be output from the feedback sensing circuit, depending on the counted switching grant period signal, and the feedback sensing circuit outputs to the control circuit a control signal which controls switching of the switching element in response to a signal based on an error between the output feedback signal and a feedback dummy signal generated from the feedback dummy current.

According to this aspect, operation reference voltages of the switching element and the control circuit, which provides the control over the switching of the switching element, are at a same potential. This obviates the need for a driver circuit for exchanging signals at different operation reference voltages. Additionally, the switching element, the control circuit, the feedback sensing circuit, the input voltage sensing circuit, and the conduction time timing circuit can be formed on a same semiconductor substrate or incorporated together in a same package. Moreover, the feedback sensing circuit corresponds to a negative signal, and thus a high-side buck converter is implemented, achieving high-efficiency drive and reduced size of the light-emitting diode driving apparatus, and space saving. Furthermore, the conduction time information on the input voltage is detected to adjust the feedback dummy current, thereby changing the output current.

Advantageous Effects

A light-emitting diode driving apparatus and semiconductor device can be implemented which allow constant current control and the dimming control if the input voltage has a phase controlled pulsating waveform, and allow the constant current control if the input voltage is smoothed.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 4A is a diagram showing waveforms when components included in the light-emitting diode driving apparatus according to the embodiment 1 are in operation.

FIG. 4B is a diagram showing waveforms when the components included in the light-emitting diode driving apparatus according to the embodiment 1 are in operation.

DESCRIPTION OF EMBODIMENTS

Hereinafter, an aspect of each embodiment will be described, with reference to the accompanying drawings. The same reference signs are given in the figures to refer to the same components, and duplicate description is therefore omitted. The embodiments below are merely an example embodying the present invention, and, in the present invention, arrangement of the components, for example, is not specific to those described below. Various modifications to the present invention are intended to be included within the scope of appended claims.

Embodiment 1

Figure 1:
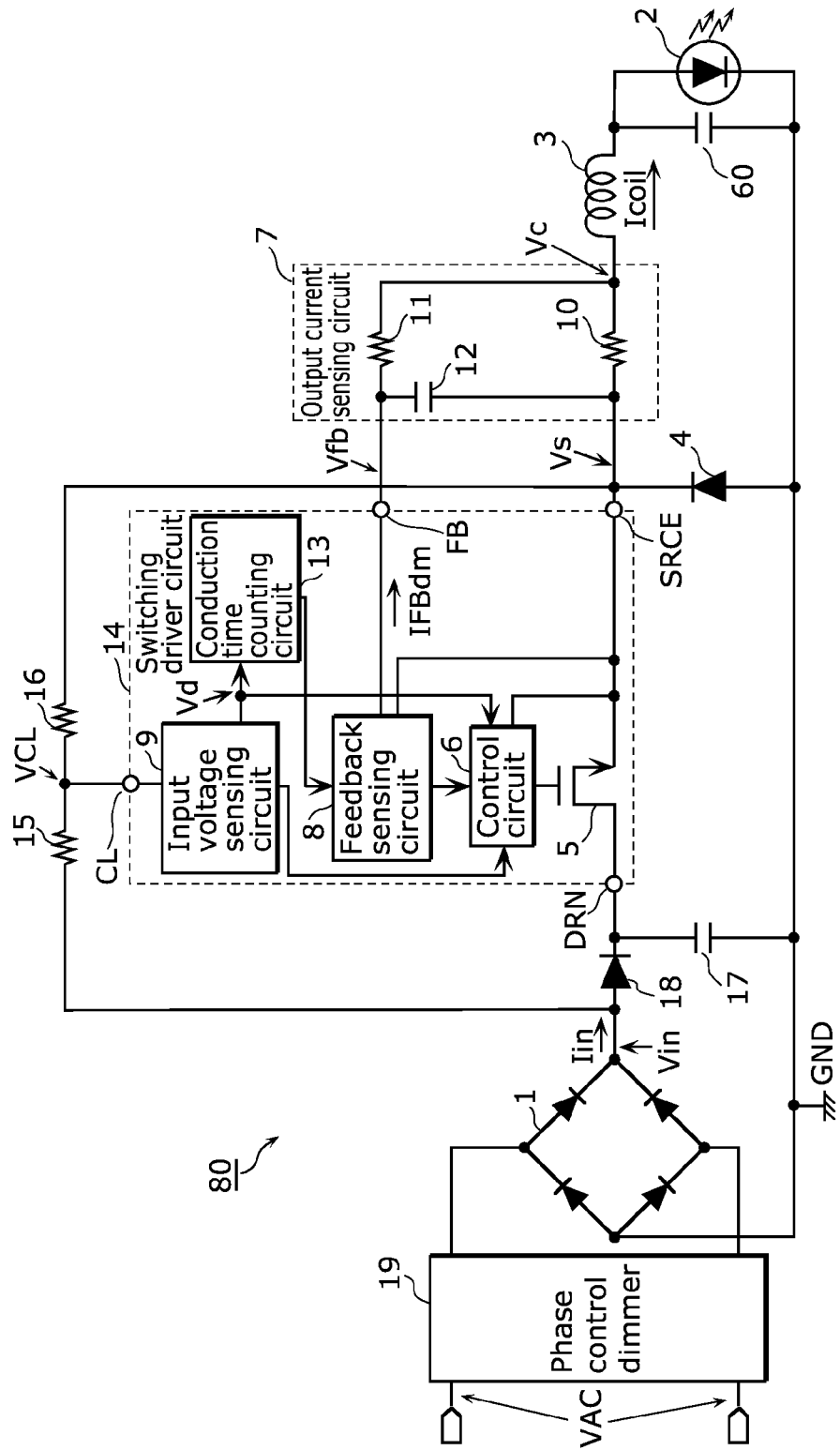
FIG. 1 is a circuit diagram showing examples of a light-emitting diode driving apparatus and a semiconductor device according to an embodiment 1.

FIG. 1 is a circuit diagram showing an example configuration of a light-emitting diode driving apparatus 80 according to an embodiment 1. The light-emitting diode driving apparatus 80 according to the present embodiment is a driving apparatus having a high-side buck converter circuit structure which drives one or more LED light sources.

In FIG. 1, a rectifying circuit 1 is connected to an AC power source (not shown), such as mains supply, and rectifies an AC voltage to generate a pulsating voltage. The rectifying circuit 1 is, for example, a full-wave rectification circuit, and generates a full-wave rectified voltage from an AC voltage. A phase control dimmer 19, which controls the phase of an AC voltage VAC supplied from the AC power source, is connected between the AC power source and the rectifying circuit 1.

The phase control dimmer 19 includes a phase control element (not shown) configured with, for example, a triac or a thyristor, a phase control circuit (not shown) which fires the phase control element by applying thereto a pulse trigger at a predetermined phase angle from a zero-crossing point, and a variable resistor (not shown) for providing variable control over the predetermined phase angle.

After fired at a predetermined firing phase angle in a half-cycle, the phase control element continues to conduct across the predetermined phase angle until the end of the half-cycle. In the present embodiment, the period from when the phase control element is fired to when the half-cycle ends will be referred to as a conduction time. The phase control element, such as a triac, turns on once a pulsed trigger signal is input to the gate. Additionally, if a fixed holding current is flowing, the phase control element remains in the on-state, and turns off upon withdrawal of the holding current. Thus, the phase control element turns on just by application of a pulse trigger to the gate when a mains phase angle at which the phase control element is desired to be turned on arrives. It is one of features of a phase control dimmer that the phase control dimmer can be configured with a simple trigger circuit in such a manner.

A high-side terminal of the rectifying circuit 1 is connected to an anode terminal of a rectifier diode 18. A cathode terminal of the rectifier diode 18 is connected to one end of a capacitor 17.

The capacitor 17 is for filtering a high frequency noise current. If a capacitance value of the capacitor 17 is quite small, a DC voltage Vin has a rectified voltage waveform that is substantially non-smooth. If a capacitance value of the capacitor 17 is sufficiently large, the DC voltage Vin on the cathode side of the rectifier diode 18 has a smoothed voltage waveform. Thus, the waveform of an input voltage Vin is made a pulsating waveform or a smoothed waveform, depending on a capacitance value of the capacitor 17.

The rectifier diode 18 is used to convert the input voltage waveform into a pulsating waveform and apply input voltage information that is proportional to the pulsating input voltage waveform to an input voltage sensing terminal CL. In other words, the rectifier diode 18 prevents a full-wave rectified input voltage waveform from being smoothed by the capacitor 17. Thus, the rectifier diode 18 is unnecessary in the case where the capacitor 17 has a quite low capacitance value and the DC voltage Vin has a rectified voltage waveform that is substantially non-smooth.

The cathode terminal of the rectifier diode 18 is connected to a high-side terminal DRN of a switching driver circuit 14. A low-side terminal of the rectifying circuit 1 is connected to a reference potential GND of the light-emitting diode driving apparatus 80.

The switching driver circuit 14 is by way of example of the light-emitting diode driving semiconductor device according to the present embodiment, and is a semiconductor device for providing constant current control over a current through an LED light source 2. As shown in FIG. 1, the switching driver circuit 14 includes at least four terminals (the high-side terminal DRN, a low-side terminal SRCE, an input voltage sensing terminal CL, and a feedback sensing terminal FB) which are connected externally. The high-side terminal DRN is connected to the high side terminal of the rectifying circuit 1 via the rectifier diode 18 and the input voltage Vin that has a pulsating voltage waveform is input thereto. The low-side terminal SRCE provides operation reference potential of the switching driver circuit 14, and is connected to the cathode terminal of the rectifier diode 18.

A switching element 5 is configured with a high-voltage n-channel MOSFET, by way of example. A drain terminal of the switching element 5 is connected to the high-side terminal DRN of the switching driver circuit 14. A source terminal of the switching element 5 is connected to the low-side terminal SRCE of the switching driver circuit 14. It should be noted that the switching element 5 is not limited to this but may be any device, such as an IGBT or a bipolar transistor.

A resistor 15 and a resistor 16 are connected in series between the high side of the rectifying circuit 1 and the low-side terminal SRCE of the switching driver circuit 14. The input voltage sensing terminal CL of the switching driver circuit 14 is connected to a common connection for the resistor 15 and the resistor 16.

In the present embodiment, the input voltage information, which is voltage information divided by the resistor 15 and the resistor 16, is applied to the input voltage sensing terminal CL. However, the present invention is not limited thereto. The input voltage information may be applied to the operation reference potential terminal SRCE of the switching driver circuit 14. For example, the input voltage information may be applied as current information to the input voltage sensing terminal CL, or may be directly applied to the input voltage sensing terminal CL, without being divided by the resistance. Means for inputting a signal by the current information or means for making an element at a voltage application terminal high-voltage tolerant in order to apply a high voltage thereto are well known to those skilled in the art, and, thus, configurations therefor will not be described in detail.

An input voltage sensing circuit 9 is connected to the input voltage sensing terminal CL of the switching driver circuit 14, and outputs to a control circuit 6 and a conduction time counting circuit 13 a switching grant period signal Vd which is based on the input voltage information input to the input voltage sensing circuit 9 through the input voltage sensing terminal CL. The input voltage sensing circuit 9 also outputs to the control circuit 6 a signal which controls a sensed value of a peak current through the switching element 5 based on the input voltage information input to the input voltage sensing circuit 9.

A feedback sensing circuit 8 is connected to the feedback sensing terminal FB of the switching driver circuit 14 and receives an output feedback signal output from an output current sensing circuit 7. The output feedback signal is indicated by a potential difference existing across a first resistor 10 that is due to a current Icoil through a choke coil 3. The feedback sensing circuit 8 outputs as a feedback dummy signal, a feedback dummy current (IFBdm) from the feedback sensing terminal FB of the switching driver circuit 14. The feedback sensing circuit 8 then outputs to the control circuit 6 a signal that controls the switching of the switching element 5 in response to a signal based on an error between the output feedback signal and the feedback dummy signal.

The operation reference potential of the control circuit 6 is at the same potential as the source terminal of the switching element 5. The control circuit 6 is connected to the low-side terminal SRCE of the switching driver circuit 14. Based on the signal from the feedback sensing circuit 8, the control circuit 6 outputs to the gate terminal of the switching element 5 a drive signal that controls the on and off operation of the switching element 5.

The LED light source 2 includes a plurality of light-emitting diodes (LED). The LED light source 2 may include at least one light-emitting diode. If the LED light source 2 includes a plurality of light-emitting diodes, the light-emitting diodes are not limited to be connected in series but may be connected in a matrix. This applies to the embodiments described below as well.

Another end of the choke coil 3 is connected to the anode terminal side of the LED light source 2. A capacitor 60 is connected across the LED light source 2 to smooth the LED current. The rectifier diode 4 is connected to the cathode terminal side of the LED light source 2 and the low-side terminal SRCE of the switching driver circuit 14 to supply the LED light source 2 with counter electromotive force developed in the choke coil 3.

The output current sensing circuit 7 includes the first resistor 10, a second resistor 11, and a capacitor 12. The first resistor 10 is connected to the low-side terminal SRCE of the switching driver circuit 14 and one end of the choke coil 3. The current Icoil through the choke coil 3 flows through the first resistor 10. The second resistor 11 is connected to the one end of the choke coil 3 and the feedback sensing terminal FB of the switching driver circuit 14. The capacitor 12 is connected to the feedback sensing terminal FB and the low-side terminal SRCE of the switching driver circuit 14. The second resistor 11 and the capacitor 12 form a filter circuit.

Next, operation of a high-side buck converter will be described. The input voltage Vin reaches a predetermined voltage upon application of a voltage to the AC power source and the switching driver circuit 14 turns on, the switching element 5 begins the on and off operation based on a desired timing that is determined by the control circuit 6. As the switching element 5 transitions from the off state to the on state, the input voltage Vin is applied to the choke coil 3 via the switching element 5 and the first resistor 10, decreasing a voltage difference between the drain terminal and the source terminal of the switching element 5 to an on-voltage of the switching element 5. Then, the current Icoil through the choke coil 3 flows through the LED light source 2 and the capacitor 60, and magnetic energy consistent with the flowing current is stored in the choke coil 3.

While the switching element 5 is on, the current flows along a path through the switching element 5, the first resistor 10, and the choke coil 3 to the LED light source 2. The current waveform in the LED light source 2 is a current waveform which has a slope that increases over time and is determined by the input voltage Vin and an inductance value L of the choke coil 3.

Next, as the switching element 5 transitions from the on state to the off state, the current through the switching element 5 is interrupted and counter electromotive force is developed by the magnetic energy stored in the choke coil 3. While the switching element 5 is off, due to the counter electromotive force developed in the choke coil 3 the current flows along a path through the choke coil 3, the LED light source 2, the rectifier diode 4, and the first resistor 10 to the choke coil 3. The current waveform in the LED light source 2 is a current waveform which has a slope that decreases over time and is determined by the inductance value L of the choke coil 3 and the total voltage of a forward voltage of the rectifier diode 4 and a forward voltage of the LED light source 2. As a result, the same current as Icoil through the choke coil 3 flows through the first resistor 10.

Figure 2:
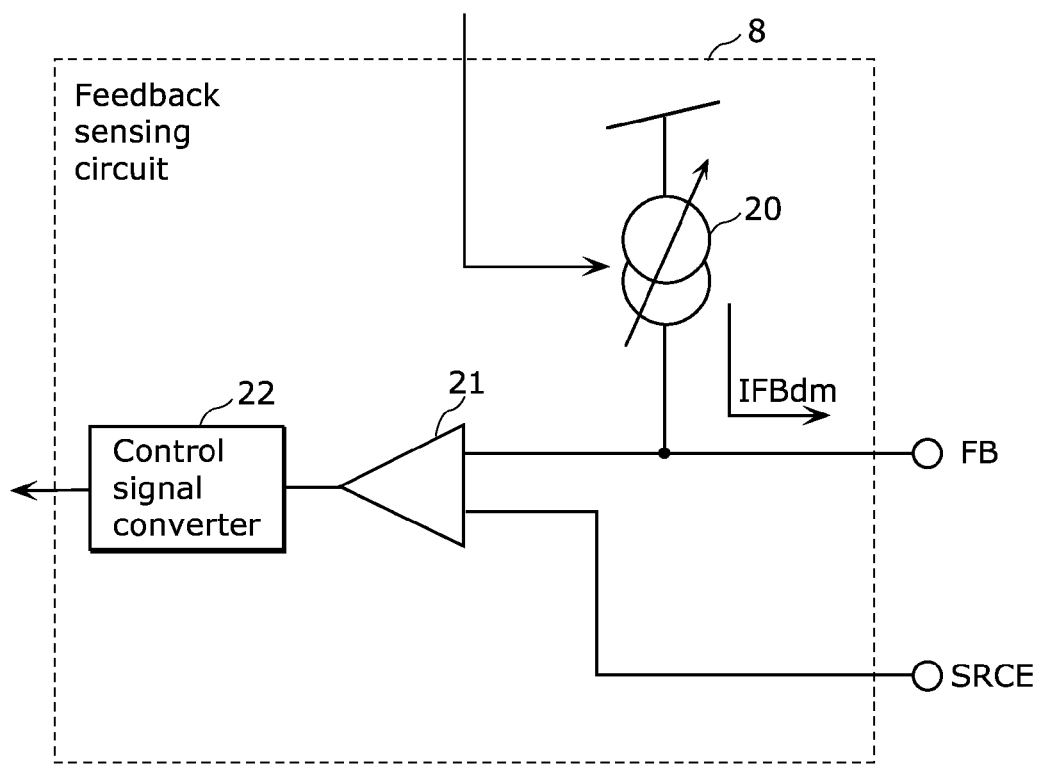
FIG. 2 is a circuit diagram showing an example of a feedback sensing circuit according to the embodiment 1.

An example of the configuration of the feedback sensing circuit 8 will be described, with reference to FIG. 2. FIG. 2 is a circuit diagram showing an example of the feedback sensing circuit 8 according to the present embodiment.

In FIG. 2, a current source 20 outputs the feedback dummy current (IFBdm) to the feedback sensing terminal (FB). A value of IFBdm, that is, a constant current value of the current source 20 is adjusted by a signal from the conduction time counting circuit 13. One of input terminals of an error amplifier 21 is connected to the feedback sensing terminal FB, and the other reference voltage input terminal is connected to the low-side terminal SRCE of the switching driver circuit 9. The output terminal of the error amplifier 21 is connected to a control signal converter 22. The control signal converter 22 outputs to the control circuit 6 a control signal that is based on an output signal from the error amplifier 1. Here, the reference voltage input terminal of the error amplifier 21 is not necessarily connected to the low-side terminal SRCE of the switching driver circuit 14 but may be connected to a constant voltage source or another external terminal of the switching driver circuit 14.

Next, feedback control according to the present embodiment will be described, with reference to FIGS. 1 and 2.

As the coil current Icoil flows through the first resistor 10, a potential difference exists across the first resistor 10. A potential difference across the first resistor 10 can be represented by (Vs−Vc), wherein Vs indicates a voltage on the low-side terminal SRCE of the switching driver circuit 14 and Vc indicates a voltage on a common connection for the first resistor 10 and the choke coil 3. The potential difference across the first resistor 10 can also be represented by the following Eq. 1:

$$Vs-Vc=Icoil \times ROS \qquad \text{Eq. 1}$$

where ROS indicates a resistance value of the first resistor 10.

A potential difference across the second resistor 11 can be represented by (Vfb−Vc), wherein Vfb indicates a voltage at the feedback sensing terminal FB. The feedback dummy current IFBdm flows from the feedback sensing terminal FB to the second resistor 11, and thus the potential difference across the second resistor 11 can also be represented by the following Eq. 2:

$$Vfb-Vc=IFBdm \times RFB \qquad \text{Eq. 2}$$

where RFB indicates a resistance value of the second resistor 11.

Using Eq. 1 and Eq. 2, Eq. 3 is calculated as follows:

$$Vfb-Vs=IFBdm \times RFB - Icoil \times ROS \qquad \text{Eq. 3}$$

Here, the following Eq. 4 is obtained when the voltage on the feedback sensing terminal FB is represented relative to the voltage Vs on the low-side terminal SRCE of the switching driver circuit 14.

$$\text{delta}(VFB)=Vfb-Vs \qquad \text{Eq. 4}$$

Using Eq. 3 and Eq. 4, Eq. 5 is calculated as follows:

$$\text{delta}(VFB)=IFBdm \times RFB - Icoil \times ROS \qquad \text{Eq. 5}$$

The delta (VFB) is a feedback voltage indicating a voltage difference of an input voltage Vfb relative to the operation reference voltage Vs of the error amplifier 21. The delta (VFB) is a positive voltage when a potential difference (IFBdm×RFB) across the second resistor 11 is greater than a potential difference (Icoil×ROS) across the first resistor 10. The delta (VFB) is a negative voltage when the potential difference (IFBdm×RFB) across the second resistor 11 is smaller than the potential difference (Icoil×ROS) across the first resistor 10.

When delta (VFB) is a positive voltage, the error amplifier 21 outputs to the control signal converter 22 a signal for substantially increasing an energy output to the LED light source 2. When delta (VFB) is a negative voltage the error amplifier 21 outputs to the control signal converter 22 a signal for substantially decreasing the energy output to the LED light source 2.

An increase in energy output to the LED light source 2 increases the coil current Icoil. Thus, the value of delta (VFB) obtained by Eq. 5 decreases. On the other hand, a decrease in energy output to the LED light source 2 decreases the coil current Icoil. Thus, the value of delta (VFB) obtained by Eq. 5 increases.

Taking advantage of such feedback operation, the switching driver circuit 14 provides control over the switching of the switching element 5 so that a first potential difference and a second potential difference existing across the second resistor 11 which is due to the feedback dummy current are substantially equal. In other words, the switching driver circuit 14 provides the control over the switching of the switching element 5 so that an absolute value of delta (VFB), which is a potential difference between the feedback sensing terminal FB and the low-side terminal SRCE, approaches zero, to maintain an average current of the coil current Icoil to be constant. As a result, the current through the LED light source 2 can be controlled to be a constant current.

While the control circuit 6 implements the control over the switching of the switching element 5 by an output signal from the control signal converter 22, it should be noted that the control means is not by way of limitation.

For example, the method, performed by the switching driver circuit 14, of controlling the switching element 5 may be a method of controlling a switching frequency of the switching element 5 in response to an increase or a decrease of the feedback voltage delta (VFB). The method, performed by the switching driver circuit 14, of controlling the switching element 5 may be a method of controlling the on-time of the switching element 5, which operates at a certain frequency, in response to an increase or a decrease of the feedback voltage delta (VFB). Also, the method, performed by the switching driver circuit 14, of controlling the switching element 5 may be a method of controlling a peak current through the switching element 5, which operates at a certain frequency, in response to an increase or a decrease of the feedback voltage delta (VFB).

The means for changing the switching frequency of the switching element 5 is referred to as pulse frequency modulation (PFM). The means for changing on-duty of the switching of the switching element 5 is referred to as pulse width modulation (PWM). The means for changing the peak value of the current through the switching element 5 is referred to as current-mode PWM.

In addition to the above, examples of the control scheme include a fixed off-time control scheme in which the off-time of the switching element 5 is fixed to a preset value, regardless of the control method. Circuits used in the above-mentioned control schemes are known to those skilled in the art, and thus configurations having such control schemes will not be described in detail.

Next, configuration and means, in a high-side buck converter circuit structure, for controlling, by the input voltage sensing circuit 9, the input voltage information based on operation reference potential SRCE of the switching driver circuit 14 which is different from reference potential GND of the light-emitting diode driving apparatus 80 will be described, with reference to FIGS. 3, 4A, and 4B.

Figure 3:
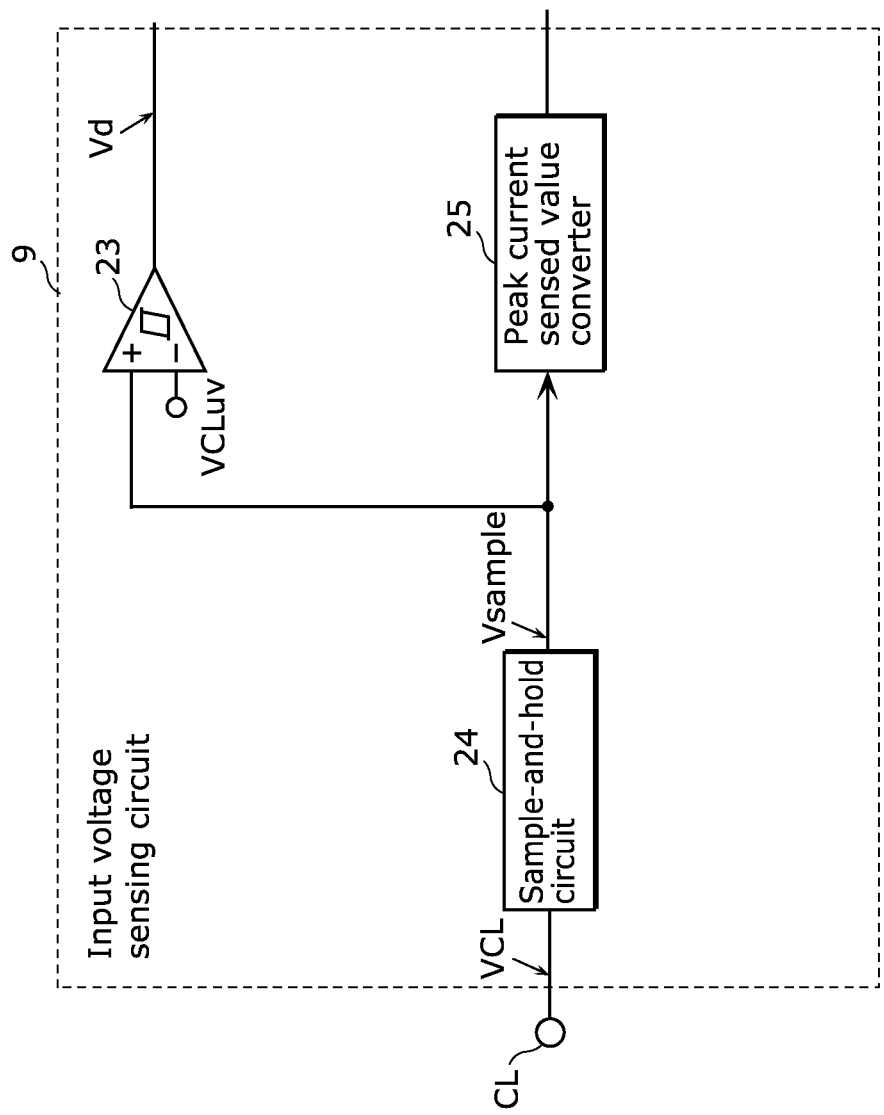
FIG. 3 is a circuit diagram showing an example of an input voltage sensing circuit according to the embodiment 1.

FIG. 3 is a circuit diagram showing an example of the input voltage sensing circuit 9 according to the present embodiment. In FIG. 3, the input voltage sensing terminal CL is connected to a sample-and-hold circuit 24. The input voltage information sampled by the sample-and-hold circuit 24 is input as a sample voltage Vsample to a comparator 23 and the peak current sensed value converter 25.

A first reference voltage (VCLuv) that has a hysteresis value (hysteresis property) is input to another input terminal of the comparator 23. The comparator 23 outputs a switching grant period signal Vd to the control circuit 6 and the conduction time counting circuit 13. The switching grant period signal Vd grants the switching of the switching element 5 if the sample voltage Vsample is at or above a first reference level and prohibits the switching of the switching element 5 if the sample voltage Vsample is below the hysteresis value of the first reference level.

If the sample voltage Vsample is greater than or equal to the first reference voltage (VCLuv), the peak current sensed value converter 25 changes the sensed value of the peak current through the switching element 5 at a preset rate in response to the sample voltage Vsample, and, when the sensed value of the peak current through the switching element 5 reaches a preset upper limit, outputs to the control circuit 6 a signal which holds the sensed value of the peak current through the switching element 5 to the preset upper limit.

A role of the sample-and-hold circuit 24 of the input voltage sensing circuit 9 according to the present embodiment in the above configuration will be described, with reference to FIGS. 4A and 4B. FIGS. 4A and 4B are diagrams showing waveforms when the components included in the light-emitting diode driving apparatus 80 according to the present embodiment are in operation. More particularly, the figures show the operations of the components in the case where the input voltage Vin has a full-wave rectified waveform and increases in a sinusoidal waveform.

An example of control provided by the sample-and-hold circuit 24 will be described, with reference to FIG. 4A. The waveform (a) of FIG. 4A is of the current Icoil which flows through the choke coil 3 due to the switching of the switching element 5 in a continuous mode. TON indicates the on-period of the switching element 5, and TOFF indicates the off-period of the switching element 5. The forward direction of the waveform (a) of FIG. 4A corresponds to the forward direction of the flow of the current Icoil through the choke coil 3 indicated by the direction of the arrow shown in FIG. 1. The waveform (b) is of the voltage on the operation reference potential terminal SRCE of the switching driver circuit 14 relative to the reference potential GND of the light-emitting diode driving apparatus in FIG. 1, namely, the operation reference voltage Vs. The waveform (c) is of the voltage on the input voltage sensing terminal CL relative to the reference potential GND of the light-emitting diode driving apparatus in FIG. 1, namely, an input voltage VCL. The waveform (d) is of a voltage on the input voltage sensing terminal CL relative to the operation reference potential terminal SRCE of the switching driver circuit 14 in FIG. 1, namely, a voltage (VCL−Vs). The waveform (e) is of an output voltage of the sample-and-hold circuit 24 relative to the operation reference potential terminal SRCE of the switching driver circuit 14 in FIG. 1, namely, a voltage (Vsample−Vs).

The waveforms at the components during the period TON where the switching element 5 is on will be described.

The current Icoil through the choke coil 3 has a current waveform which linearly increases as indicated by the waveform (a). The operation reference voltage Vs relative to the reference potential GND is, as indicated by the waveform (b), at the same potential as the input voltage Vin (Ignoring voltage drop due to a resistive component of the switching element 5.). The input voltage VCL to the input voltage sensing terminal CL rises in proportion to the input voltage Vin as indicated by the waveform (c). Representing the input voltage VCL to the input voltage sensing terminal CL, relative to the operation reference voltage Vs of the switching driver circuit 14, a potential difference is not present as indicated by the waveform (d). In the period TON where the switching element 5 is on as indicated by the waveform (e), the sample-and-hold circuit 24 does not sense the input voltage VCL input to the input voltage sensing terminal CL and outputs, as the sample voltage Vsample, a voltage sensed in the previous period TOFF.

Next, the waveforms at the components in the period TOFF where the switching element 5 is off will be described. The current Icoil through the choke coil 3 has a current waveform which linearly decreases as indicated by the waveform (a). Due to the counter electromotive force developed in the choke coil 3, the operation reference voltage Vs relative to the reference potential GND is a negative voltage by a forward voltage VF of the rectifier diode 4, as indicated by the waveform (b). The input voltage VCL to the input voltage sensing terminal CL rises in proportion to the input voltage Vin. Representing the input voltage VCL to the input voltage sensing terminal CL relative to the operation reference voltage Vs of the switching driver circuit 14, potential is generated as indicated by the waveform (d). The sample-and-hold circuit 24 samples the voltage VCL input to the input voltage sensing terminal CL in the period TOFF where the switching element 5 is off, and outputs the sampled voltage VCL to the sample voltage Vsample when the switching element 5 has switched from the off state to the on state as indicated by the waveform (e).

As described above, the sample-and-hold circuit 24 does not sense the voltage VCL during the period where the switching element 5 is on. Due to this, the voltage sensed in the previous period TOFF is held and output as the sample voltage Vsample to the subsequent circuit. The sample-and-hold circuit 24 samples the voltage VCL in the period where the switching element 5 is off. Due to this, the voltage sensed in the previous period TOFF is held and output as the sample voltage Vsample to the subsequent circuit. Then, the sample-and-hold circuit 24 updates the sample voltage Vsample with the sampled voltage VCL when the switching element 5 has switched from the off state to the on state.

The sample-and-hold circuit 24 may provide control other than that descried in the above example. Another example of the control provided by the sample-and-hold circuit 24 of the input voltage sensing circuit 9 according to the present embodiment will be described, with reference to FIG. 4B.

The waveform (a) of FIG. 4B is of the current Icoil which flows through the choke coil 3 due to the switching of the switching element 5 in the non-continuous mode. TON indicates the on-period of the switching element 5, and TOFF indicates the off-period of the switching element 5. The forward direction of the waveform (a) of FIG. 4B corresponds to the forward direction of the flow of the current Icoil through the choke coil 3 indicated by the direction of the arrow shown in FIG. 1. The waveform (b) is of the voltage on the operation reference potential terminal SRCE of the switching driver circuit 14 relative to the reference potential GND of the light-emitting diode driving apparatus in FIG. 1, namely, the operation reference voltage Vs. The waveform (c) is of the voltage on the input voltage sensing terminal CL relative to the reference potential GND of the light-emitting diode driving apparatus in FIG. 1, namely, the input voltage VCL. The waveform (d) is of a voltage on the input voltage sensing terminal CL relative to the operation reference potential terminal SRCE of the switching driver circuit 14 in FIG. 1, namely, the voltage (VCL−Vs). The waveform (e) is of the output voltage of the sample-and-hold circuit 24 relative to the operation reference potential terminal SRCE of the switching driver circuit 14 in FIG. 1, namely, the voltage (Vsample−Vs).

The waveforms at the components in the period TON where the switching element 5 is on will be described.

The current Icoil through the choke coil 3 has a current waveform which linearly increases as indicated by the waveform (a). The operation reference voltage Vs relative to the reference potential GND is, as indicated by the waveform (b), at the same potential as the input voltage Vin (Ignoring voltage drop due to a resistive component of the switching element 5.). The input voltage VCL to the input voltage sensing terminal CL rises in proportion to the input voltage Vin as indicated by the waveform (c). Representing the input voltage VCL to the input voltage sensing terminal CL, relative to the operation reference voltage Vs of the switching driver circuit 14, a potential difference is not present as indicated by the waveform (d). In the period TON where the switching element 5 is on as indicated by the waveform (e), the sample-and-hold circuit 24 does not sense the input voltage VCL input to the input voltage sensing terminal CL and outputs, as the sample voltage Vsample, a voltage sensed in the previous period TOFF.

Next, the waveforms at the components in the period TOFF where the switching element 5 is off will be described. The current Icoil through the choke coil 3 has a current waveform which linearly decreases as indicated by the waveform (a). Since the switching of the switching element 5 is in the non-continuous mode, Icoil does not flow through the choke coil 3 once all the counter electromotive force stored in the choke coil 3 is released, ending up with a substantially zero current. Moreover, due to the counter electromotive force developed in the choke coil 3, the operation reference voltage Vs relative to the reference potential GND is a negative voltage by a forward voltage VF of the rectifier diode 4, as indicated by the waveform (b). Once all the counter electromotive force stored in the choke coil 3 is released, the switching driver circuit 14 is unable to hold the forward voltage VF of the rectifier diode 4, and thus the waveform of the operation reference voltage Vs rings due to parasitic capacitance, for example. The input voltage VCL to the input voltage sensing terminal CL rises in proportion to the input voltage Vin as indicated by the waveform (c). Representing the input voltage VCL to the input voltage sensing terminal CL relative to the operation reference voltage Vs of the switching driver circuit 14, potential is generated as indicated by the waveform (d). Although the input voltage VCL has a stable waveform in a period where a current flows through the choke coil 3 due to release of counter electromotive force, the input voltage VCL has a ringing waveform after the end of release of the counter electromotive force.

The sample-and-hold circuit 24 has a preset sampling period which starts after the switching element 5 has been turned off, and samples the voltage VCL input to the input voltage sensing terminal CL in the sampling period as indicated by the waveform (e), and outputs the sampled voltage VCL as the sample voltage Vsample (a sampling signal) at the end of the sampling period.

As described above, the sample-and-hold circuit 24 does not sense the voltage VCL during the period where the switching element 5 is on. Due to this, the voltage sensed in the previous period TOFF is held and output as the sample voltage Vsample to the subsequent circuit. The sample-and-hold circuit 24 has the preset sampling period which starts after the switching element 5 has been turned off, and samples the voltage VCL in the sampling period. Due to this, the sample-and-hold circuit 24 holds the voltage sensed in the previous period TOFF and output it as the sample voltage Vsample to the subsequent circuit. Then, the sample-and-hold circuit 24 updates the sample voltage Vsample with the sampled voltage VCL at the end of the sampling period. Since the sample-and-hold circuit 24 has the sampling period, the voltage VCL can be accurately sensed without being affected by jitter in input waveform generated during periods other than the preset sampling period.

As described above, the input voltage sensing circuit 9 can sense the input voltage information, based on the operation reference potential SRCE of the switching driver circuit 14 different from the reference potential GND of the light-emitting diode driving apparatus 80. Then, the switching driver circuit 14 controls the sensed value of the peak current through the switching element 5 substantially in proportion to the waveform of the input voltage Vin. This allows the switching driver circuit 14 to yield the input current waveform that is substantially proportional to the waveform of the input voltage Vin, enhancing the power factor.

Moreover, the input voltage sensing circuit 9 includes a peak current sensed value converter which changes the sensed value of the peak current through the switching element 5 at the preset rate in response to the sample voltage Vsample, and, when the sensed value of the peak current through the switching element 5 reaches the preset upper limit, outputs to the control circuit 6 the signal which holds the sensed value of the peak current through the switching element 5 to the preset upper limit. However, the present invention is not limited thereto.

For example, the input voltage sensing circuit 9 may change the on-time of the switching element 5 at a preset rate, in response to the sample voltage Vsample, and outputs to the control circuit 6 the signal which holds the on-time to a preset upper limit when the on-time reaches the preset upper limit. Extending the on-time of the switching element 5 at a high input voltage increases the sensed value of the peak current through the switching element 5, as compared with the case of a fixed on-time.

As a result, the switching driver circuit 14 can control the sensed value of the peak current through the switching element 5 substantially in proportion to the waveform of the input voltage Vin, thereby yielding an input current that has a waveform substantially proportional to the waveform of the input voltage Vin. Thus, the power factor is enhanced.

Figure 5:
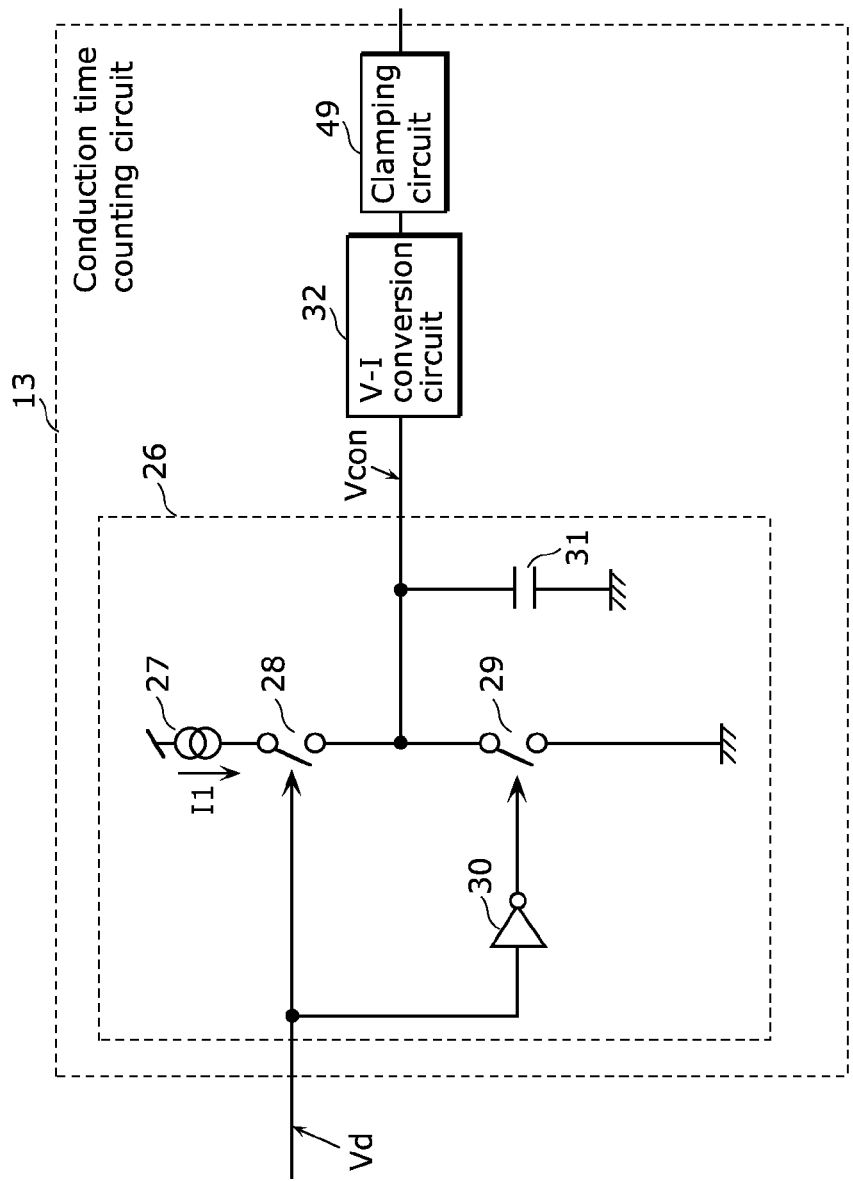
FIG. 5 is a circuit diagram showing an example of a conduction time counting circuit according to the embodiment 1.

Next, an example configuration of the conduction time counting circuit 13 will be described, with reference to FIG. 5. FIG. 5 is a circuit diagram showing an example of the conduction time counting circuit 13 according to the present embodiment.

In FIG. 5, the conduction time counting circuit 13 includes a charging and discharging circuit 26, a V-I conversion circuit 32, and a clamping circuit 49.

The charging and discharging circuit 26 includes a constant current source 27, switches 28 and 29, an inverter 30, and a capacitor 31. During a period where the switching grant period signal Vd is a grant signal, Vd is at a level "H," and during a period where the switching grant period signal Vd is a prohibit signal, Vd is at a level "L." The switching grant period signal Vd output from the input voltage sensing circuit 9 is input to the switch 28 and the inverter 30. When the switching grant period signal Vd is at the level "H," the switch 28 turns on and the switch 29 turns off, which charges the capacitor 31 with a constant current I1 from the constant current source 27. When the switching grant period signal Vd is at the level "L," the switch 28 turns off and the switch 29 turns on, and the switch 29 instantly discharges the voltage the capacitor 31 is charged with.

An output of the charging and discharging circuit 26 is connected to the V-I conversion circuit 32. The V-I conversion circuit 32 is a circuit which converts an input voltage into a current which has a value according to a voltage level.

An output of the V-I conversion circuit 32 is connected to the clamping circuit 49. The clamping circuit 49 has a first threshold and a second threshold which are preset. If a value of the current input to the clamping circuit 49 is less than or equal to the first threshold the clamping circuit 49 outputs a preset lower limit constant current. If the value of the current input is greater than or equal to the second threshold the clamping circuit 49 outputs a preset upper limit constant current.

As a result, the longer the period where the switching grant period signal Vd is the grant signal, the higher the voltage Vcon the capacitor 31 is charged with. Then, as the switching grant period signal Vd switches to the prohibit signal, the voltage Vcon on the capacitor 31 drops to a zero level. Then, the voltage Vcon is converted into a current which has a value by the V-I conversion circuit 32 and output to the current source 20 of the feedback sensing circuit 8 via the clamping circuit 49, and determines the value determines a value of the constant current (IFBdm) of the current source 20.

The shorter the period where the switching grant period signal Vd is the grant signal, the smaller the voltage Vcon is. If the value of the current converted from the voltage Vcon is lower than the first threshold set by the clamping circuit 49, the clamping circuit 49 outputs the preset lower limit constant current. Thus, the value of the constant current (IFBdm) of the current source 20 of the feedback sensing circuit 8 is of the lower limit.

The longer the period where the switching grant period signal Vd is the grant signal, the greater the voltage Vcon is. If the value of the current converted from the voltage Vcon is higher than the second threshold set by the clamping circuit 49, the clamping circuit 49 outputs the preset upper limit constant current. Thus, the value of the constant current (IFBdm) of the current source 20 of the feedback sensing circuit 8 is of the upper limit.

If the period where the switching grant period signal Vd is the grant signal is in a range not restricted by the clamping circuit 49, the value of the constant current (IFBdm) of the current source 20 of the feedback sensing circuit 8 varies depending on a length of the period where the switching grant period signal Vd is the grant signal.

The light-emitting diode driving apparatus 80 described above may be implemented in a semiconductor device which has at least the switching element 5, the control circuit 6, the feedback sensing circuit 8, the input voltage sensing circuit 9, and the conduction time counting circuit 13 formed on a same semiconductor substrate or incorporated in a same package.

Moreover, implementation of an LED bulb which includes the light-emitting diode driving apparatus 80 described above or a semiconductor device having the light-emitting diode driving apparatus 80 mounted thereon is also possible. Implementation of the light-emitting diode driving apparatus 80 is also possible which includes, in particular, a cylindrical base to which AC or DC power is input, wherein an input of the rectifying circuit 1 is connected to the base, and the rectifying circuit 1, the LED light source 2 which includes at least one or more light-emitting diodes, the choke coil 3, the rectifier diode 4 which supplies the LED light source 2 with the counter electromotive force developed in the choke coil 3 are integrated within a housing. Moreover, implementation of the light-emitting diode driving apparatus 80 is possible which further includes the semiconductor device integrated within a housing, the semiconductor device having at least the switching element 5, the control circuit 6, the feedback sensing circuit 8, the input voltage sensing circuit 9, and the conduction time counting circuit 13 formed on a same semiconductor substrate or incorporated in a same package. In this case, the base has two terminals to which two terminals which are inputs of the rectifying circuit 1 are electrically connected.

In the light-emitting diode driving apparatus 80 according to the present embodiment in the above configuration, the operation reference voltages of the switching element 5 and the control circuit 6, which provides the control over the switching of the switching element 5, are at the same potential. This obviates the need for a driver circuit for exchanging signals at different reference potential. Moreover, the light-emitting diode driving apparatus 80 according to the present embodiment allows the switching element 5, the control circuit 6, the feedback sensing circuit 8, the input voltage sensing circuit 9, and the conduction time counting circuit 13 to be formed on a same semiconductor substrate, or achieves implementation of the switching driver circuit 14 that has the switching element 5, the control circuit 6, the feedback sensing circuit 8, the input voltage sensing circuit 9, and the conduction time counting circuit 13 incorporated together in a same package, thereby readily achieving a small, lightweight, and, additionally, low-cost light-emitting diode driving apparatus.

Moreover, this configuration can provide an LED bulb which allows adjusting a value of a current to be supplied to an LED in response to output of a phase control dimmer.

Moreover, the above configuration is not limited to the light-emitting diode driving apparatus 80 according to the embodiment 1, but may be applied to light-emitting diode driving apparatuses according to the other embodiments described below.

Moreover, the feedback sensing circuit 8 corresponds to a negative signal, and thus a high-side buck converter is implemented, achieving high-efficiency drive and reduced size of the light-emitting diode driving apparatus, and space saving. In particular, the light-emitting diode driving apparatus 50 according to the present embodiment is suited to a set which requires for large reduction in size and space saving, such as an LED bulb.

Moreover, the feedback sensing circuit 8 outputs the control signal to the control circuit 6 so that the first potential difference existing across the first resistor 10 due to the current through the choke coil 3 and the second potential difference existing across the second resistor 11 due to the feedback dummy current IFBdm are substantially equal, allowing the feedback information to be transferred to the control circuit 6 without directly sensing, at the feedback sensing circuit 8, the output feedback signal which is a negative signal relative to reference potential of the control circuit 6. Since the output feedback signal need not be directly input to the feedback sensing circuit 8, power loss in the choke coil current and the first resistor 10 can be reduced by arbitrarily setting values of the first resistor 10 and the second resistor 11.

Moreover, since the reference voltage Vs of the error amplifier 21 is substantially equal to the operation reference voltage of the control circuit 6, control is made to substantially increase the energy output to the LED light source 2 when an applied voltage to the feedback sensing terminal FB is a positive voltage, control is made to substantially decrease the energy output to the LED light source 2 when the applied voltage to the feedback sensing terminal FB is a negative voltage. Thus, a signal, both positive and negative signals, can be applied to the feedback sensing terminal FB.

Moreover, in the configuration where the switching element 5 and the control circuit 6 are disposed on the high side of the input voltage, the voltage applied to the input voltage sensing terminal CL of the input voltage sensing circuit 9 is sensed only in the period where the switching element 5 is turned off. Thus, the input voltage sensing circuit 9 can accurately sense the input voltage information.

Furthermore, since the input voltage sensing circuit 9 senses an input signal only in the preset sampling period that is after the switching element 5 is turned off in the on and off operation, the input voltage information can be accurately sensed without being affected by jitter in input waveform generated during periods other than the preset sampling period.

Moreover, the input voltage sensing circuit 9 can prohibit the switching of the switching element 5 when there is little voltage difference between the input voltage and the output voltage or when the input voltage is very low. Thus, stable switching control of the switching element 5 is allowed. Moreover, since the sampling period can be identified when the input voltage waveform is a pulsating waveform, the conduction time of a phase-controlled input voltage can be counted. Moreover, the sensed value of the peak current through the switching element 5 can be varied in response to the input voltage, and, additionally, the upper limit of the peak current is restricted, preventing currents above its rating from flowing through the switching element and so on.

Furthermore, the input voltage sensing circuit 9 senses the input voltage information to control the value of the peak current through the switching element 5, thereby providing control to substantially proportionate the input voltage waveform and the input current waveform to each other. This increases a conduction angle of the input current, so that the input current waveform changes substantially in phase with the input voltage waveform. Thus, the power factor is enhanced.

Moreover, the feedback dummy current value can be linearly varied by the conduction time counting circuit 13, depending on the duration of the sampling period. The feedback dummy current is adjusted to adjust a second potential difference existing across the second resistor 11, thereby providing the dimming control over the output current to be supplied to the LED light source 2. As a result, the dimming control can be provided over the output current to be supplied to the LED light source 2, according to the conduction time of the phase-controlled input voltage.

Effects obtained from the light-emitting diode driving apparatus according to the embodiment 1 are not limited to the embodiment 1 but similar effects are obtained even from the light-emitting diode driving apparatus according to the embodiments 2 to 5 described below.

Embodiment 2

A light-emitting diode driving apparatus and a semiconductor device according to an embodiment 2 will be described. The light-emitting diode driving apparatus according to the present embodiment is different in conduction time counting circuit, as compared to the conduction time counting circuit 13 of the light-emitting diode driving apparatus according to the embodiment 1 shown in FIG. 1. The other components are the same as those included in the light-emitting diode driving apparatus according to the embodiment 1 and thus the description thereof will be omitted.

Figure 6:
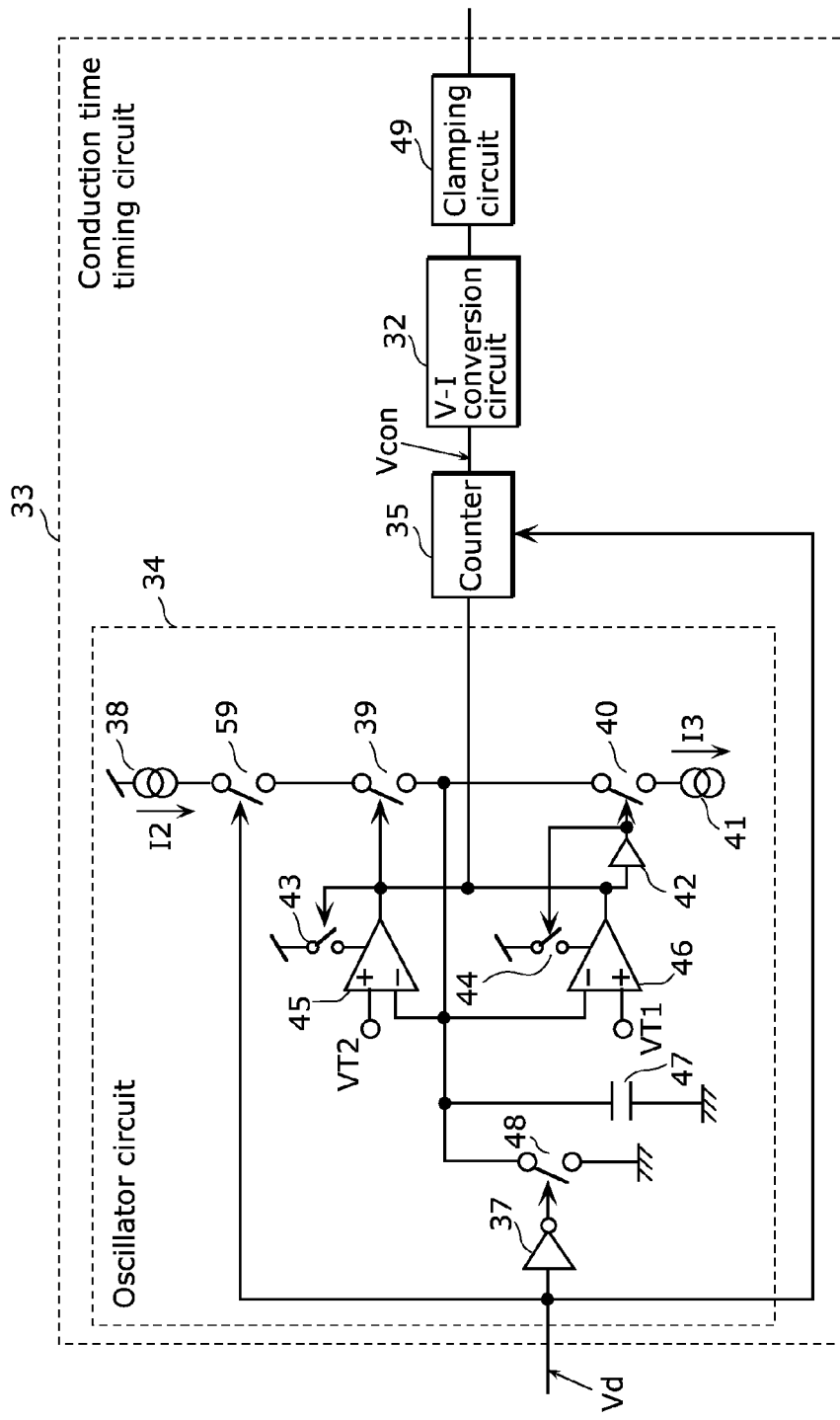
FIG. 6 is a circuit diagram showing an example of a conduction time counting circuit according to an embodiment 2.

FIG. 6 is a circuit diagram showing an example of a conduction time timing circuit 33 according to the present embodiment. The same reference signs are given in FIG. 6 to refer to the same components as those in FIG. 5, and duplicate description is therefore omitted.

In FIG. 6, the conduction time timing circuit 33 includes an oscillator circuit 34, a counter 35, a V-I conversion circuit 32, and a clamping circuit 49.

The oscillator circuit 34 includes constant current sources 38 and 41, switches 39, 40, 43, 44, 48, and 59, invertors 37 and 42, the capacitor 47, and comparators 45 and 46. The constant current source 38 charges the capacitor 47 with a constant current I2. The constant current source 41 discharges the capacitor 47 with a constant current I3. An input terminal of each of the comparators 45 and 46 is connected to the capacitor 47 and a preset reference voltage is applied to another input terminal. Output terminals of the comparators 45 and 46 are commonly coupled. A reference voltage VT2 is applied to the positive input terminal of the comparator 45, and a reference voltage VT1 lower than the reference voltage VT2 is applied to the positive input terminal of the comparator 46.

During a period where a switching grant period signal Vd is a grant signal, Vd is at a level "H," and during a period where the switching grant period signal Vd is a prohibit signal, Vd is at a level "L." The switching grant period signal Vd output from an input voltage sensing circuit 9 is input to the inverter 37. When the switching grant period signal Vd is at the level "L," the switch 59 turns off and the switch 48 turns on, and the switch 48 instantly discharges the voltage the capacitor 47 is charged with, holding the voltage on the capacitor 47 to a zero level.

When the switching grant period signal Vd is at the level "H," the switch 59 turns on and the switch 48 turns off, and discharging and charging of the capacitor 47 start.

In other words, the voltage on the capacitor 47 is lower than the reference voltage VT1 when the switching grant period signal Vd switches from the level "L" to the level "H." Due to this, both the comparators 45 and 46 output signals at the level "H." This turns the switches 39 and 43 on, at which time the switches 40 and 44 turn off via the inverter 42, and thus the comparator 46 stops operating. As a result, the capacitor 47 is charged with the constant current I2 from the constant current source 38.

As the voltage on the capacitor 47 increases greater than the reference voltage VT2, the comparator 45 outputs a signal at the level "L." As a result, the switch 39 turns off and the supply of the constant current I2 from the constant current source 38 to the capacitor 47 stops. Then the switch 40 turns on via the inverter 42, and the constant current source 41 charges the capacitor 47 by the constant current I3. Also, the signal at the level "L" from the comparator 45 is input to the counter 35, and the switch 43 turns off and the switch 44 turns on. Thus, the comparator 45 stops operating and the comparator 46 starts operating.

Next, as the voltage on the capacitor 47 increases greater than the reference voltage VT1, the comparator 46 outputs a signal at the level "H." As a result, the switch 40 turns off via the inverter 42, and the constant current source 41 stops discharging the capacitor 47 by the constant current I3. Additionally, the switch 39 turns on and the constant current I2 is supplied from the constant current source 38 to the capacitor 47. Also, the signal at the level "H" from the comparator 46 is input to the counter 35, and the counter 35 is incremented by 1. Furthermore, the switch 43 turns on and the switch 44 turns off. Thus, the comparator 46 stops operating and the comparator 45 starts operating.

This sequence of operations causes the oscillator circuit 34 to generate a constant clock frequency determined by the constant currents I2 and I3, the reference voltages VT1 and VT2, and a capacitance value of the capacitor 47. The counter 35 increments when applied with clock signals from the oscillator circuit 34, generates a voltage Vcon in response to a count and outputs the voltage Vcon to the V-I conversion circuit 32. When the switching grant period signal Vd switches to the level "L", the counter 35 is reset.

Figure 7:
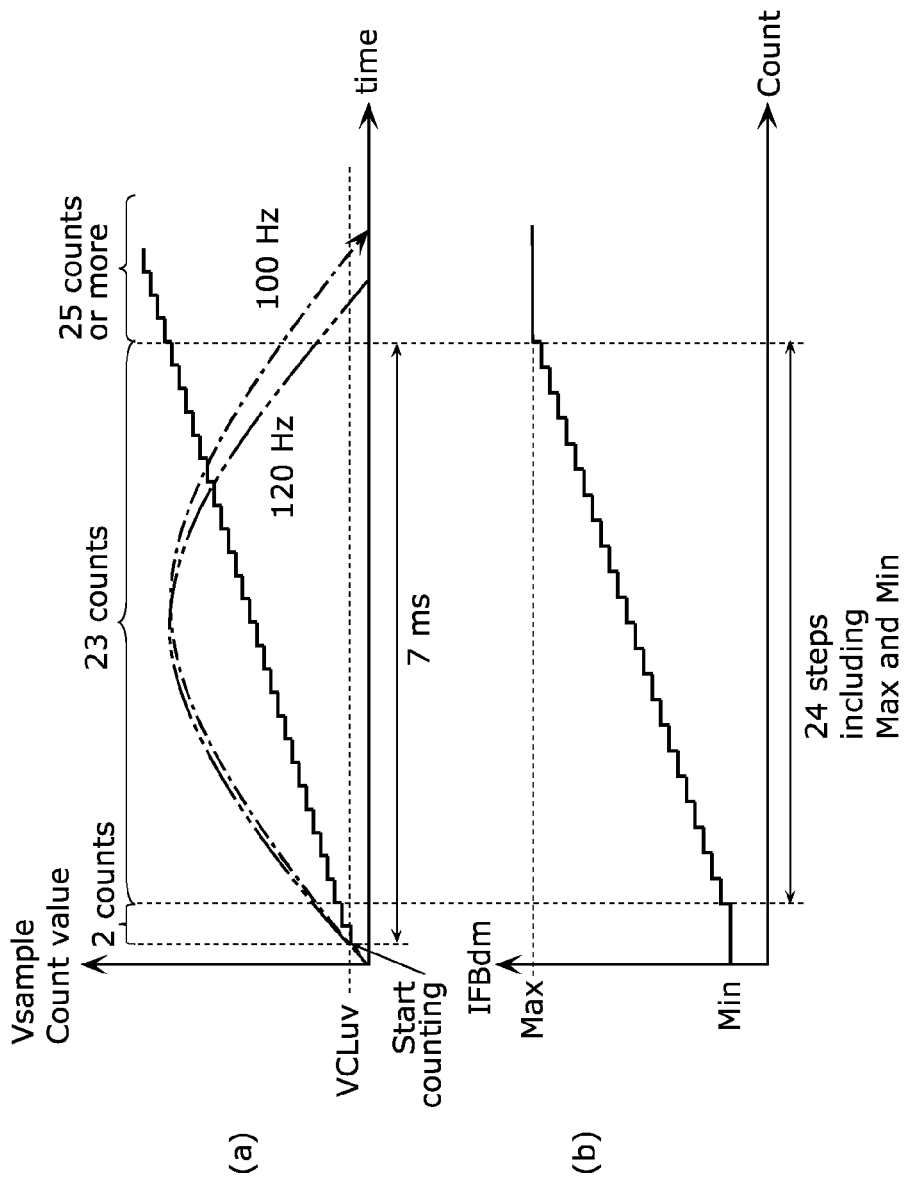
FIG. 7 is a diagram showing an example of a relationship between operation of a counter and a feedback dummy current according to the embodiment 2.

Next, referring to FIG. 7, a relationship between a count recorded by the counter 35 and a feedback dummy current will be described. FIG. 7 is a diagram showing the relationship between the feedback dummy current and the operation of the counter according to the present embodiment, wherein (a) of FIG. 7 shows a sample voltage and a count and (b) of FIG. 7 shows the feedback dummy current.

In (a) of FIG. 7, time is indicated on the horizontal axis and the sample voltage Vsample and a count are indicated on the vertical axis. The waveform of the sample voltage Vsample when an input half-cycle is 100 Hz is indicated by the dot-dash line, the waveform of the sample voltage Vsample when the input half-cycle is 120 Hz is indicated by the dot-dot-dash line, and the count recorded over time is indicated by the solid line.

A period where the sample voltage Vsample is less than VCLuv is a period where the switching grant period signal is the prohibit signal, and thus the oscillator circuit 34 is off and the counter remains 0. Then, once the sample voltage Vsample is greater than or equal to VCLuv the oscillator circuit 34 starts operating and outputs clock signals. The counter 35 then increments in response to the clock signals.

In (b) of FIG. 7, the count is indicated on the horizontal axis and a feedback dummy current IFBdm is indicated on the vertical axis.

In the example of the present embodiment, a first threshold set by the clamping circuit 49 corresponds to two counts recorded by the counter 35. A second threshold set by the clamping circuit 49 corresponds to 7 ms and 25 counts recorded by the counter 35. As a result, a value of the feedback dummy current IFBdm is held to a lower limit Min during a period for two counts after the counter 35 started incrementing, as shown in (b) of FIG. 7. For third and the subsequent counts recorded by the counter 35, the value of the feedback dummy current IFBdm gradually steps up in response to the count.

Where the count is 25 or more, the value of the feedback dummy current IFBdm is held to an upper limit Max. Here, the feedback dummy current IFBdm is held to the lower limit Min during a period for two counts recorded by the counter 35, and the feedback dummy current IFBdm is held to the upper limit Max during a period for 25 counts or more recorded by the counter 35. However, the present invention is not limited thereto. Incrementing the count set to the lower limit Min and the upper limit Max increases resolution of the dimming control within one input half-cycle. This, however, complicates the circuit of the counter 35. A person skilled in the art is allowed to select appropriate constants from resolution of the dimming control relative to a circuit size.

As described above, the value of the feedback dummy current IFBdm digitally steps up in response to a period, in one input half-cycle, where the switching grant period signal is at the level "H." As the switching grant period signal switches to the level "L," the counter 35 is reset, and the value of the feedback dummy current IFBdm is held to the lower limit Min.

Moreover, if the period, in one input half-cycle, where the switching grant period signal is at the level "H" is 7 ms or longer, the feedback dummy current IFBdm is fixed to the upper limit Max. In the case where the input half-cycle is 100 Hz, one cycle is 10 ms. In the case where the input half cycle is 120 Hz, one cycle is about 8.3 ms. Thus, in both cases where the frequency of the AC power source is 50 Hz and 60 Hz, the feedback dummy current IFBdm can be held to the upper limit Max when the conduction time is at a maximum level.

Figure 8:
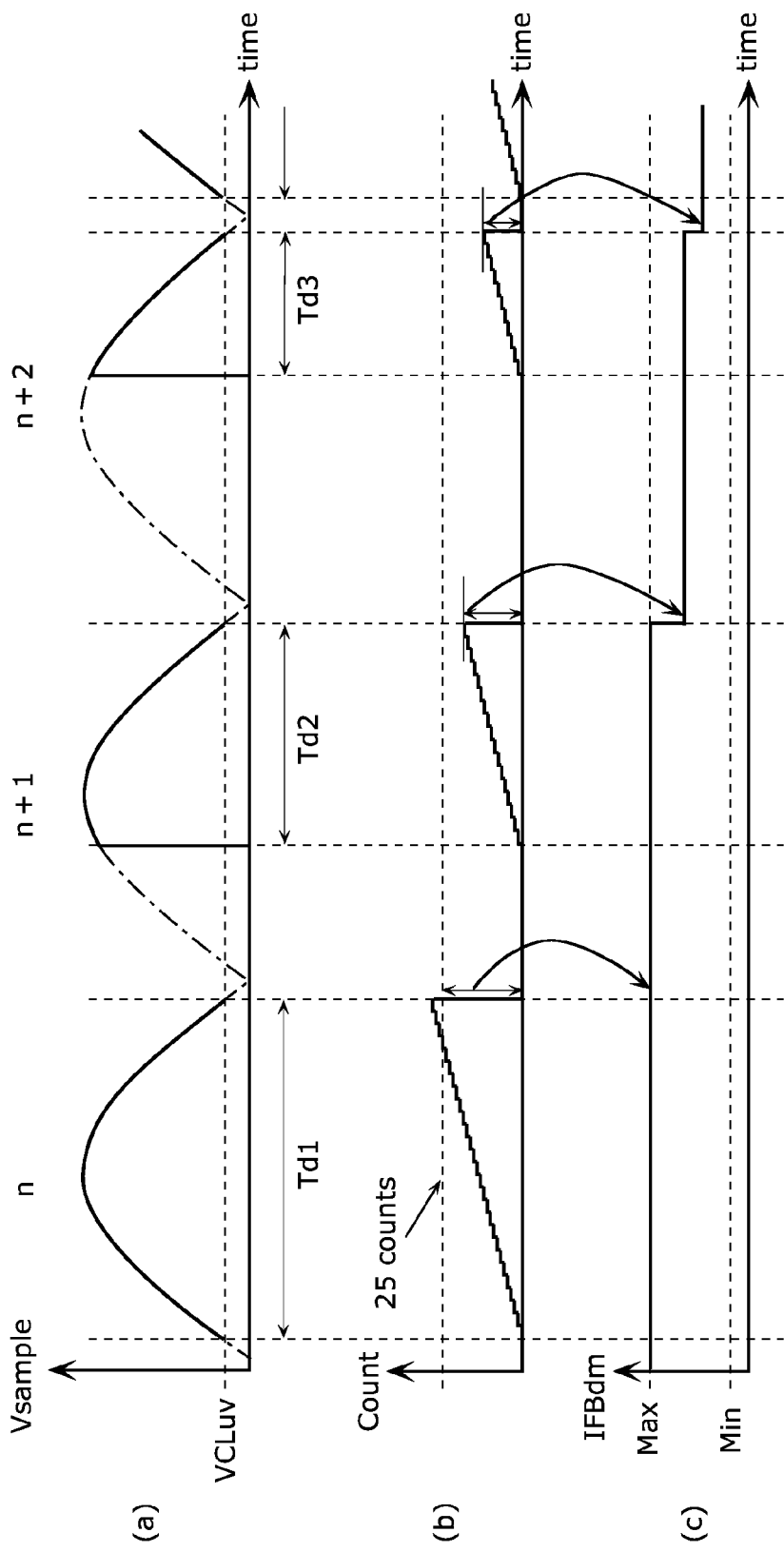
FIG. 8 is a diagram showing a relationship between the operation of the counter and the feedback dummy current according to the embodiment 2 for each input half-cycle.

Next, referring to FIG. 8, another example of the relationship between the operation of the counter and the feedback dummy current for each input half-cycle will be described. FIG. 8 is a diagram showing the relationship between the operation of the counter and the feedback dummy current for each input half-cycle according to the present embodiment, wherein (a) of FIG. 8 shows the sample voltage Vsample, (b) FIG. 8 shows a count, and (c) of FIG. 8 shows the feedback dummy current.

The waveform in (a) of FIG. 8 is of the sample voltage Vsample over time. A portion where the sample voltage Vsample is higher than a threshold voltage VCLuv is indicated by the solid line, and a portion where the sample voltage Vsample is lower than the threshold voltage VCLuv is indicated by the dot-dash line. In (a) of FIG. 8, waveforms in the nth (the left), n+1th (the middle), and n+2th (the right) input half-cycles are indicated. Periods where the sample voltage Vsample is higher than the threshold voltage VCLuv, that is, periods where the switching grant period signal is the grant signal are indicated by Td1, Td2, and Td3. Thus, a period where the switching grant period signal is the grant signal that has the waveform in the nth input half-cycle is Td1, the period for the n+1th input half-cycle is Td2, and the period for the n+2th input half-cycle is Td3, satisfying the relationship of Td1>Td2>Td3.

The waveform in (b) of FIG. 8 indicates a count over time. The count depends on a period where the switching grant period signal is the grant signal. The count is greater than 25 counts in the period Td1 where the switching grant period signal is the grant signal in the nth input half-cycle. The count is less than 25 counts in the periods Td2 and Td3 where the switching grant period signal is the grant signal in the respective n+1th and n+2th input half-cycles.

The waveform in (c) of FIG. 8 is of the feedback dummy current over time. When the conduction time of the input half-cycle is a maximum, the feedback dummy current IFBdm is held to Max.

For the waveform in the nth input half-cycle, the period Td1 where the switching grant period signal is the grant signal is sufficiently long, and, thus, the counter 35 exceeds 25 counts. In this case, the feedback dummy current IFBdm is limited to the upper limit Max due to the action of the clamping circuit 49. Then, the value of the feedback dummy current IFBdm at the end of the period Td1 where the switching grant period signal is the grant signal is applied as a value of the feedback dummy current for the n+1th input half-cycle, and held during the n+1th input half-cycle.

Then, for the waveform in the n+1th input half-cycle, the counter 35 is recorded during the period Td2 where the switching grant period signal is the grant signal. The value of the feedback dummy current IFBdm at the end of the period Td2 is applied as a value of the feedback dummy current for the n+2th input half-cycle and held during the n+2th input half-cycle.

Similarly, for the waveform in the n+2th input half-cycle, the counter 35 recorded during the period Td3 where the switching grant period signal is the grant signal, and the determined value of the feedback dummy current IFBdm is applied as a value of the feedback dummy current for the n+3th input half-cycle, and held during the n+3th input half-cycle.

In such a manner, the value of the feedback dummy current IFBdm determined by the count recorded during the nth input half-cycle is applied as a value of the feedback dummy current IFBdm in the subsequent n+1th input half-cycle. Thus, the value of the feedback dummy current IFBdm is fixed during one input half-cycle and the output current to the LED light source 2 is adjusted so as to match the set value.

The example is illustrated in FIG. 8, with reference to a leading edge dimmer that does not conduct for a certain time period of the rising edge of the input half-cycle. However, a phase control dimmer 19 is not limited thereto. Since the feedback dummy current is adjusted depending on the duration where the switching grant period signal is at the level "H," the present embodiment, including all the embodiments according to the present invention, is also effective using a trailing edge dimmer that conducts during a certain time period of the rising edge of the input half-cycle and does not conduct during a certain time period of the falling edge.

The light-emitting diode driving apparatus according to the present embodiment in the above configuration uses the counter 35 to time the duration of the switching grant period, thereby reducing the capacitance value of the capacitor 47 of the charging and discharging circuit 26. The light-emitting diode driving apparatus according to the present embodiment can also change the feedback dummy current value, in response to the count.

Moreover, the conduction time timing circuit 33 includes the clamping circuit 49. This allows holding the feedback dummy current of the feedback sensing circuit 8 to a preset value if the duration of the switching grant period is less than or equal to a first preset time or greater than or equal to a second preset time, for example. In both cases where the input half-cycle of the pulsating input voltage waveform is 50 Hz and 60 Hz, the conduction time timing circuit 33 can also hold the feedback dummy current to the upper limit when the conduction time by the phase control dimmer 19 is a maximum.

Moreover, the feedback dummy current can be fixed during each of the input half-cycles of the pulsating input voltage waveform. As a result, a set current value in one input half-cycle in response to a phase controlled input voltage waveform is fixed. This allows varying a value of the output current in response to the conduction time when the conduction angle changes, and allows stable control over the output current when the conduction angle is fixed.

Effects similar to those obtained from the embodiment 1 can be achieved as well.

Embodiment 3

A light-emitting diode driving apparatus and a semiconductor device according to an embodiment 3 will be described. A feature of the light-emitting diode driving apparatus according to the present embodiment is that a sensed value of a peak current through a switching element is low during a certain time period in the beginning of an input half-cycle.

In other words, the action of a peak current sensed value converter 25 of an input voltage sensing circuit 9 according to the embodiment 3 is different from that in the embodiment 1 shown in FIG. 3.

Figure 9:
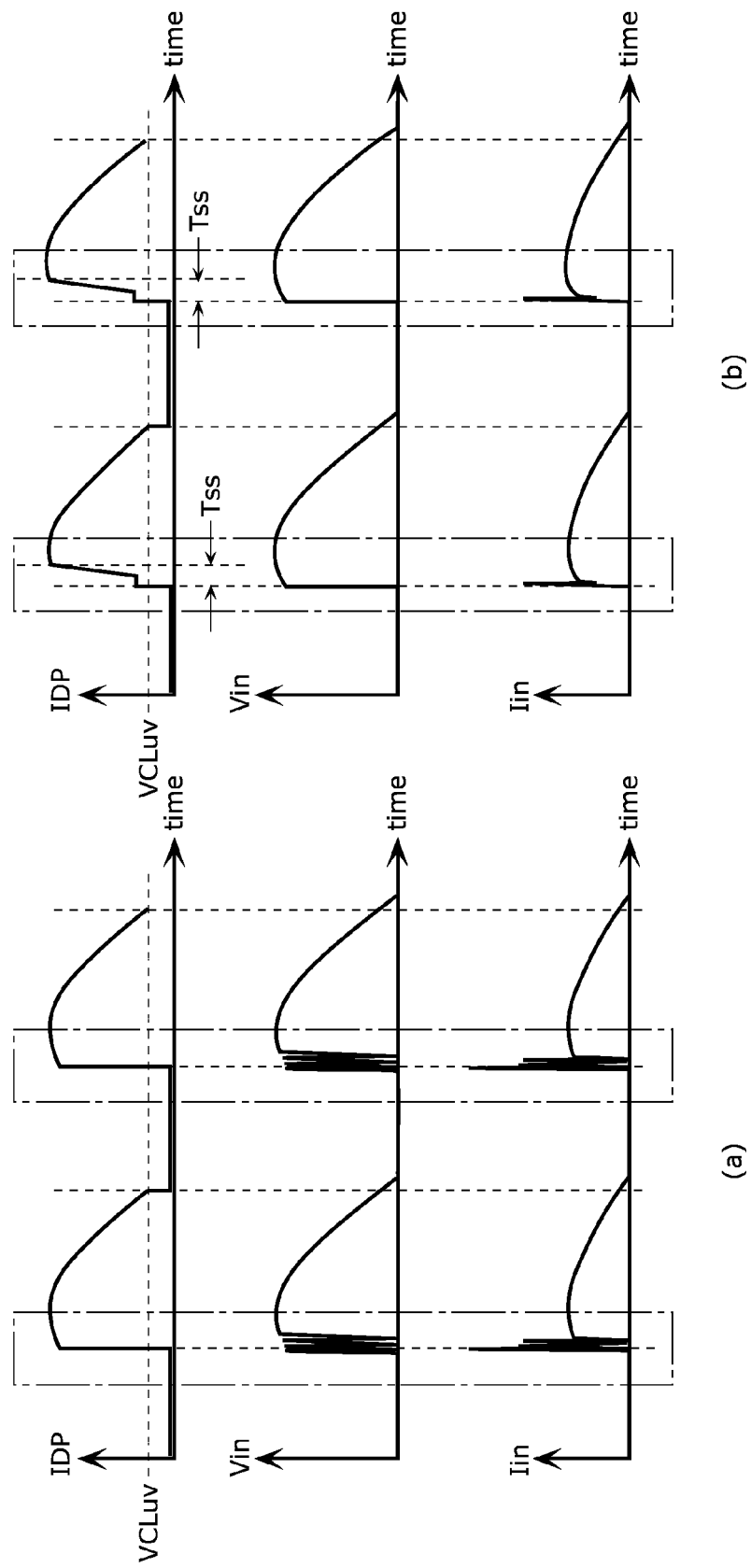
FIG. 9 is a waveform chart showing examples of a current through a switching element according to an embodiment 3, an input voltage waveform, and an input current waveform.

FIG. 9 is a waveform chart showing examples of a current through the switching element according to the present embodiment, an input voltage waveform, and an input current waveform.

Part (a) of FIG. 9 shows a waveform obtained by the peak current sensed value converter 25 according to the embodiment 3. A waveform of the peak current that has the sensed value IDP and through the switching element 5 is shown at the top of (a) of FIG. 9. A switching grant period signal is at the level "L" during a period where a sample voltage Vsample is lower than VCLuv, during which the switching of the switching element 5 is prohibited. Then, as the switching grant period signal switches to the level "H" a value of the sensed value IDP of the peak current in response to the sample voltage Vsample is set due to the action of the peak current sensed value converter 25 of the input voltage sensing circuit 9.

A waveform of an input voltage Vin which is phase-controlled full-wave rectified voltage that has undergone a rectifying circuit 1 is indicated in the middle of (a) of FIG. 9. The waveform of an input current Iin is indicated at the bottom of (a) of FIG. 9.

In the case where a phase control dimmer 19 is a leading edge dimmer, the phase control dimmer 19 does not conduct during a certain time period of the rising edge of the input half-cycle. An input voltage is applied at a moment the phase control dimmer 19 conducts. Thus, when a high input voltage is abruptly applied the sensed value IDP of the peak current through the switching element 5 is set to high as shown in the regions indicated by the dot-dot-dash line. This passes an excessive current through the switching element 5. As a result, the input current Iin increases instantly, causing a period, thereafter, where the input current does not flow. Then, the input voltage Vin ends up having jitter in waveform. As a result, ringing occurs in the waveforms of the input voltage Vin and the input current Iin. In the case where the phase control dimmer 19 includes a triac device, for example, if a period lasts a long time where the input current does not flow due to ringing, the holding current stops flowing through the triac device. This prevents the phase control dimmer 19 from holding the on-state of the triac device, ending up with a malfunctioning of the phase control dimmer 19.

On the other hand, the peak current sensed value converter 25 of the input voltage sensing circuit 9 sets the sensed value of the peak current through the switching element 5 to a desired value smaller than a preset upper limit during a certain time period Tss which has been preset and is after the switching grant period signal at the level "H" is output. In outputting a signal therefor to a control circuit 6, the sensed value IDP of the peak current has the waveform as indicated at the top of (b) of FIG. 9. It should be noted that the waveform of the input voltage Vin is indicated in the middle of (b) of FIG. 9 and the waveform of the input current Iin is indicated at the bottom of (b) of FIG. 9.

In other words, in the waveform of the peak current that has the sensed value IDP at the top of (b) of FIG. 9, the switching grant period signal is at the level "L" during a period where the sample voltage Vsample is lower than VCLuv, during which the switching of the switching element 5 is prohibited. Then, as the switching grant period signal switches to the level "H," the value of the sensed value IDP of the peak current through the switching element 5 is set lower than the sensed value IDP of the peak current in response to the sample voltage Vsample. Due to this, the value of the sensed value IDP of the peak current through the switching element 5 changes, during the certain time period Tss, to the original set value of the sensed value IDP of the peak current through the switching element 5 in response to the sample voltage Vsample. As described above, the low sensed value IDP of the peak current immediately after the switching of the switching element 5 starts allows a low increase in input current Iin, thereby preventing ringing in the waveform of the input current Iin. As a result, no jitter occurs in the waveform of the input voltage Vin either, and, if the phase control dimmer 19 includes a triac device, the holding current to the triac device is assured, thereby preventing a malfunctioning of the phase control dimmer 19.

While in the present embodiment, the sensed value IDP of the peak current through the switching element 5 is reduced to suppress the ringing in the waveform of the input current Iin immediately after the switching of the switching element 5 starts, it should be noted that the present invention is not limited thereto. For example, during the certain time period Tss that has been preset and is after the switching grant period signal at the level "H" is output, the switching frequency of the switching element 5 is set to a desired value smaller than a preset upper limit. A signal therefor may be output to the control circuit 6. A low switching frequency immediately after the switching of the switching element 5 starts saves power per certain time period, thereby allowing a low increase in the input current Iin.

The light-emitting diode driving apparatus according to the present embodiment in the above configuration can prevent an input inrush current, which is due to the phase control dimmer 19 during a certain time period in the beginning of each input half-cycle, from being generated, thereby preventing a malfunctioning of the phase control dimmer 19.

Effects similar to those obtained from the embodiments 1 and 2 can be achieved as well.

Embodiment 4

A light-emitting diode driving apparatus and a semiconductor device according to an embodiment 4 will be described. The light-emitting diode driving apparatus according to the present embodiment is different in configuration of a switching driver circuit 50 and a control circuit 53, as compared to the embodiment 1.

Figure 10:
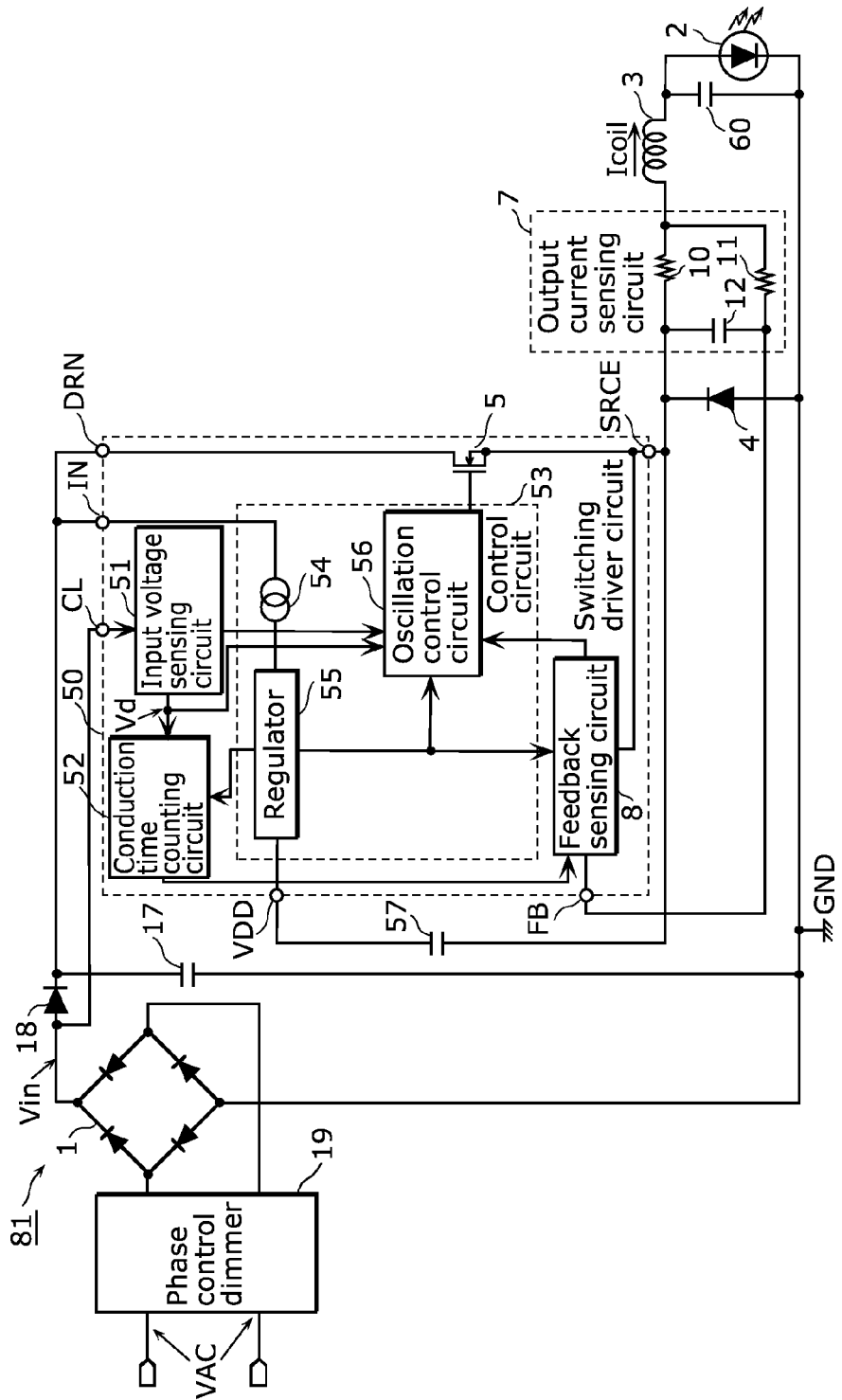
FIG. 10 is a circuit diagram showing examples of a light-emitting diode driving apparatus and a semiconductor device according to an embodiment 4.

FIG. 10 is a circuit diagram showing an example of a light-emitting diode driving apparatus 81. Compared with the switching driver circuit 14 according to the embodiment 1 in FIG. 1, the switching driver circuit 50 has two more terminals (a rectified voltage application terminal IN, a power source terminal VDD) connected externally. The rectified voltage application terminal IN is connected to a cathode terminal of a rectifier diode 18, and an input voltage Vin having a pulsating voltage waveform is input to the rectified voltage application terminal IN via the rectifier diode 18. A capacitor 57 is connected between the power source terminal VDD and a low-side terminal SRCE.

The control circuit 53 includes a constant current source 54. The constant current source 54 is connected to the rectified voltage application terminal IN on one end, generates a constant current from the input voltage Vin, and outputs it to a regulator 55.

The control circuit 53 also includes the regulator 55. The regulator 55 is connected between the constant current source 54 and the power source terminal VDD, charges the capacitor 57 with a constant current from the constant current source 54, and operates in such a way that a capacitor voltage (a voltage Vdd of the power source terminal VDD) is constant. The regulator 55 also outputs an activation signal if the voltage Vdd of the power source terminal VDD is greater than or equal to a predetermined value, and outputs a deactivation signal if the voltage Vdd is less than the predetermined value. The regulator 55 also supplies a power supply voltage to the control circuit.

The control circuit 53 includes an oscillation control circuit 56. The oscillation control circuit 56 outputs a signal that provides the control over the switching of the switching element 5, based on the activation signal and the deactivation signal from the regulator 55, and output signals from a feedback sensing circuit 8 and an input voltage sensing circuit 51.

Upon receipt of the activation signal from the regulator 55, a conduction time counting circuit 52 measures if a period where a switching grant period signal is a grant signal is greater than or equal to a threshold indicating a third preset time.

The light-emitting diode driving apparatus 81 according to the embodiment 4 in the above configuration can achieve effects similar to those obtained from the embodiments 1 to 3.

Next, referring to FIG. 11, operations of the components included in the light-emitting diode driving apparatus 81 according to the present embodiment will be described in the case where a phase control dimmer shown in FIG. 10 is not connected to the light-emitting diode driving apparatus 81, the capacitance value of a capacitor 17 is sufficiently large, and an input voltage is smoothed.

Figure 11:
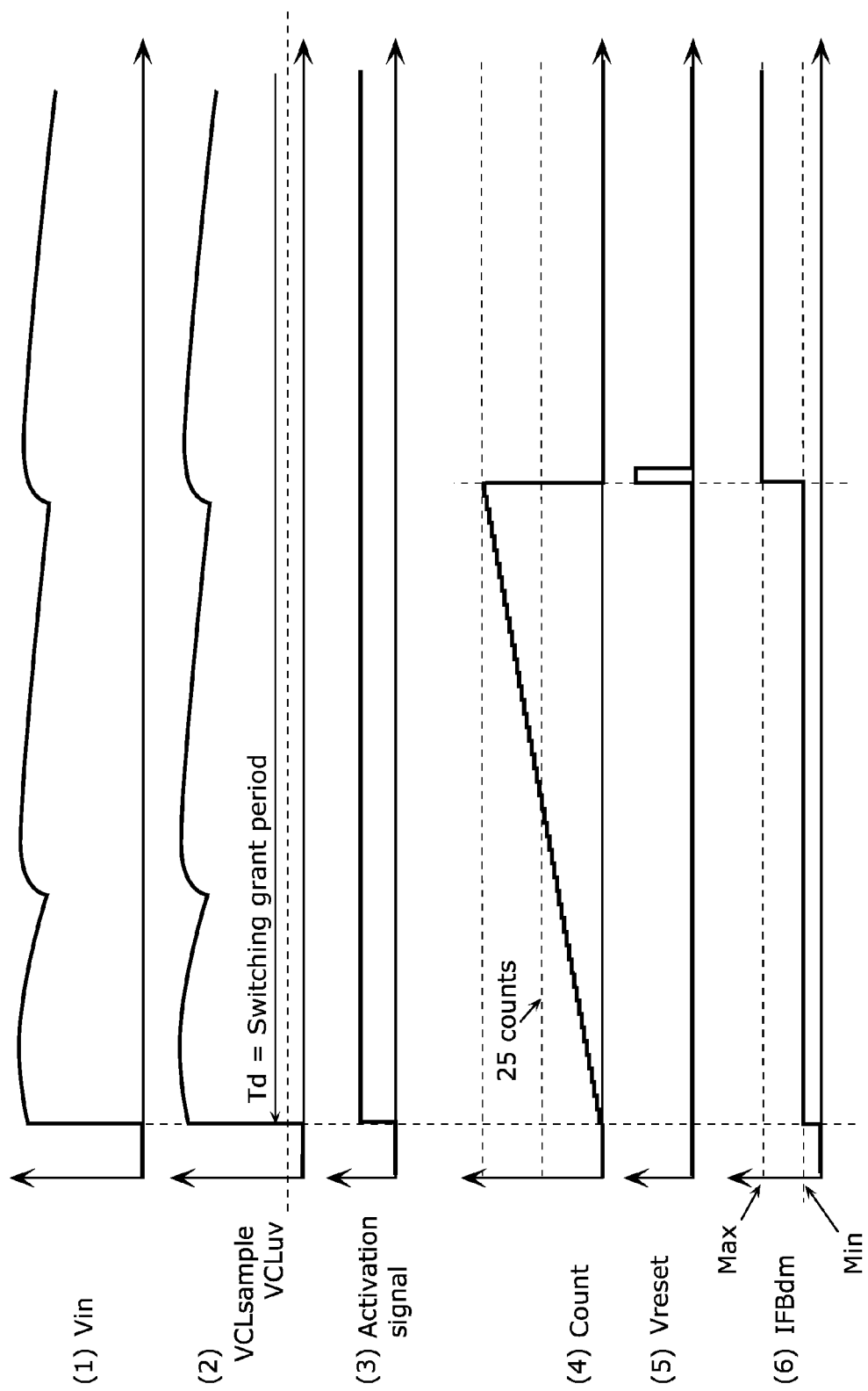
FIG. 11 is a diagram showing waveforms when components included in the light-emitting diode driving apparatus according to the embodiment 4 are in operation.

FIG. 11 is a diagram showing waveforms when components included in the light-emitting diode driving apparatus according to the present embodiment are in operation.

In FIG. 11, the waveform (1) indicates a waveform of the input voltage Vin. The input voltage Vin, although slightly drops when charged to the capacitor 17, is a substantially smoothed voltage.

The waveform (2) indicates a waveform of the sample voltage VCLsample. The waveform (2) is obtained by the input voltage Vin that is input at a certain time point. Once the input voltage Vin is applied, the sample voltage Vsample after the output of the activation signal is always above the first reference voltage VCLuv.

The waveform (3) is of the activation signal output from the regulator 55. In the waveform (2), the high level indicates that the switching is granted and the low level indicates that the switching is prohibited. The input voltage Vin is input at the certain time point, a constant current is input from a constant current source 54, and when a capacitor terminal voltage Vdd on the power source terminal VDD is greater than or equal to a constant value, the regulator 55 outputs the activation signal.

Moreover, as shown in FIG. 6, the conduction time counting circuit 52 sets a value of a feedback dummy current IFBdm when the switching grant period signal is the grant signal at the level "L" to the feedback dummy current next time the switching grant period signal switches to the level "H." According to this configuration, if the input voltage is a smoothed voltage, the input voltage sensing circuit 51, after the regulator 55 outputs the activation signal, constantly outputs the signal at the level "H" as the switching grant period signal, and thus the conduction time counting circuit 52 cannot set the feedback dummy current IFBdm.

The conduction time counting circuit 52, however, includes the regulator 55, in addition to the oscillator circuit 34, the counter 35, the V-I conversion circuit 32, and the clamping circuit 49 shown in FIG. 6. If the period where the switching grant period signal is the grant signal is greater than or equal to the threshold indicating the third preset time during a period where the regulator 55 outputs the activation signal, the conduction time counting circuit 52 resets the counter 35 and fixes the feedback dummy current IFBdm to a preset upper limit. According to this configuration, the conduction time counting circuit 52 performs operation for outputting signals having wavelengths as indicated by the waveforms (4), (5), and (6).

In other words, the waveform (4) indicates the count recorded by the counter 35 included in the conduction time counting circuit 52. After the regulator 55 outputs the activation signal, the oscillator circuit 34 of the conduction time counting circuit 52 begins operation and outputs periodic clock signals to increment the counter 35. The counter 35 continues to increment more than 25 counts if the switching grant period signal is at the level "H." However, once the counter 35 reaches a count indicated by the threshold indicating the third preset time, a signal Vreset having the waveform (5) is output and the counter 35 is forcibly reset.

The waveform (6) indicates a waveform of the feedback dummy current IFBdm. After the regulator 55 outputs the activation signal, the feedback dummy current IFBdm is held to the lower limit Min. Then, the value of the feedback dummy current IFBdm is set to the upper limit Max at a time when the signal Vreset is output and the counter is reset, and the value is held.

While, for the switching grant period signal, the third preset time is determined by the counts recorded by the counter, it should be noted that the present invention is not limited thereto. The preset third time may be set with a value of the voltage Vcon that is set by the charging and discharging circuit 26, as with the conduction time counting circuit 13 of FIG. 5. In either case, the third preset time is set longer than a time which takes the feedback dummy current IFBdm to reach the upper limit set by the clamping circuit 49.

The light-emitting diode driving apparatus 81 according to the present embodiment in the above configuration can fix the feedback dummy current to the preset upper limit if the input voltage is a smoothed voltage, although the input voltage sensing circuit 51 is unable to output the switching grant period signal which prohibits the switching of the switching element. Thus, the normal operation of the light-emitting diode driving apparatus 81 according to the present embodiment is allowed even if connected to an apparatus to which a phase control dimmer is not connected.

Effects similar to those obtained from the embodiment 1 can be achieved as well.

Embodiment 5

A light-emitting diode driving apparatus and semiconductor device according to an embodiment 5 will be described.

The light-emitting diode driving apparatus according to the present embodiment is different from the embodiments 1 to 4 in that a flyback converter circuit structure is employed, rather than a buck converter circuit structure as employed in the embodiments 1 to 4. In the present embodiment, an example of the switching driver circuit 50 shown in FIG. 10, which is an example of the embodiment 4, that employs a flyback converter circuit structure will be shown. The same modification is possible also to the switching driver circuit 14 shown in FIG. 1, which is an example of the embodiment 1, that employs a flyback converter circuit structure.

Figure 12:
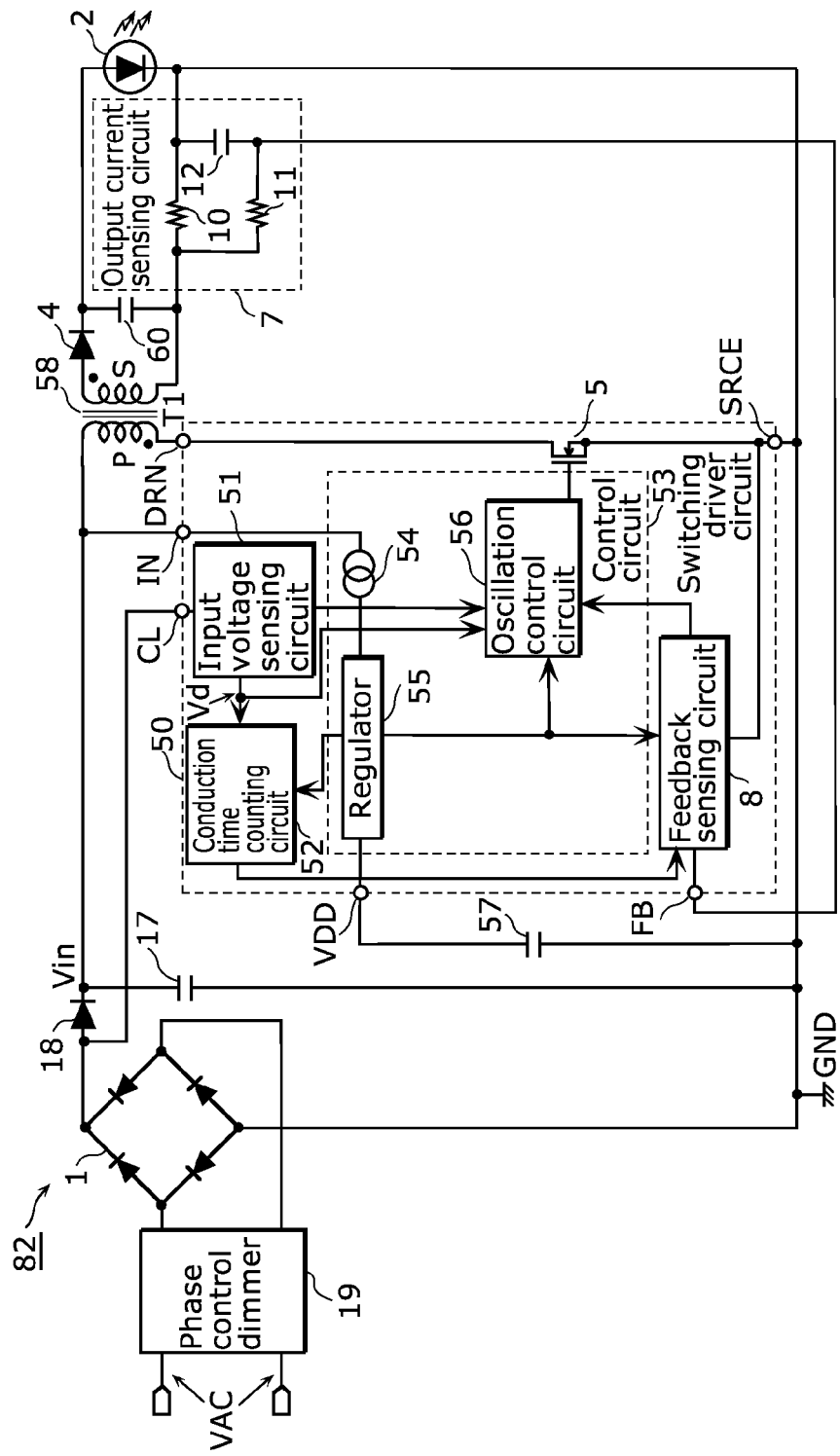
FIG. 12 is a circuit diagram showing examples of a light-emitting diode driving apparatus and a semiconductor device according to an embodiment 5.

FIG. 12 is a circuit diagram showing an example of a light-emitting diode driving apparatus 82 according to the present embodiment. In FIG. 12, a switching driver circuit 50 has the same configuration as the switching driver circuit 50 in FIG. 10. Roles of a rectifying circuit 1, capacitors 12, 17, 57, 60, rectifier diodes 4, 18, an output current sensing circuit 7, and an LED light source 2 are the same as those of the respective components referred to by the same reference signs in FIGS. 1 and 10, and thus detailed description will be omitted.

A transformer 58, as an energy conversion circuit, has a primary winding P and a secondary winding S. One end of the primary winding P is connected to a cathode terminal of the rectifier diode 18, and an input power supply voltage Vin is applied thereto. The other end of the primary winding P is connected to a high-side terminal DRN of the switching driver circuit 50. The rectifier diode 4 and the capacitor 60 are connected to the secondary winding S of the transformer 58, and energy transformed by the transformer 58 is output to the LED light source 2. A cathode terminal of the LED light source 2 is connected to the output current sensing circuit 7 and a reference potential GND of the light-emitting diode driving apparatus 82. The output current sensing circuit 7 includes: a first resistor 10 connected to the LED light source 2, which is a load, and the low side of the secondary side of the transformer 58; a second resistor 11 connected, in parallel with the first resistor 10, to the LED light source 2, which is the load, and the low side of the secondary side of the transformer 58; and a capacitor 12 connected between the first resistor 10 and a feedback sensing terminal FB of a feedback sensing circuit 8. The output current sensing circuit 7 is connected to the cathode terminal of the LED light source 2, the secondary winding S of the transformer 58, and one end of the capacitor 60. The output current sensing circuit 7 outputs a sensed feedback signal to the feedback sensing terminal FB of the feedback sensing circuit 8.

A rectified voltage application terminal IN of the switching driver circuit 50 is connected to the cathode terminal of the rectifier diode 18, and a rectified input voltage Vin is input thereto. An input voltage sensing terminal CL is connected to the anode terminal of the rectifier diode 18, and the rectified input voltage Vin is input thereto. The high-side terminal DRN is connected to the transformer 58 as the energy conversion circuit. The feedback sensing terminal FB of the feedback sensing circuit 8 is connected to the output current sensing circuit 7. A low-side terminal SRCE is connected to the reference potential GND of the light-emitting diode driving apparatus 82. The capacitor 57 is connected between a power source terminal VDD and the low-side terminal SRCE.

The light-emitting diode driving apparatus 82 stores energy at the transformer 58 in a period where a switching element 5 is turned on, and outputs the stored energy to the LED light source 2 via the rectifier diode 4 in a period where the switching element 5 is turned off. Here, the current through the LED light source 2 also flows through the first resistor 10 in the output current sensing circuit 7. As a result, the control circuit 53 outputs a control signal so that a first potential difference existing across the first resistor 10 and a second potential difference existing across the second resistor 11 due to the feedback dummy current IFBdm are substantially equal. This allows the feedback information to be transferred to the control circuit 53, without the feedback sensing circuit 8 directly sensing the output feedback signal which is a negative signal relative to reference potential of the control circuit 53.

The switching driver circuit 50 for use in the light-emitting diode driving apparatus 82 according to the embodiment 5 in the above configuration, which is used in the light-emitting diode driving apparatus in a buck converter circuit structure, may also be used in the light-emitting diode driving apparatus in a flyback converter circuit structure.

Effects similar to those obtained from the embodiment 1 can be achieved as well.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The light-emitting diode driving apparatus and a semiconductor device according to the present invention is applicable to devices and apparatuses in general that use a light-emitting diode. The light-emitting diode driving apparatus and the semiconductor device according to the present invention are applicable as, in particularly, an LED bulb or an LED lighting apparatuses, for example.

The invention claimed is:

1. A light-emitting diode driving apparatus comprising:
   a rectifying circuit which rectifies an AC voltage input from an AC power source, to output a DC voltage;
   a switching element having an input terminal connected to a high side of the rectifying circuit, which turns on and off the DC voltage;
   a choke coil having one end connected to an output terminal of the switching element;
   an output current sensing circuit connected between the output terminal of the switching element and the one end of the choke coil, for sensing a current through the choke coil;
   an LED light source which includes one or more light-emitting diodes each having an anode terminal connected to another end of the choke coil and a cathode terminal connected to a low side of the rectifying circuit;
   a rectifier diode having an anode terminal connected to the low side of the rectifying circuit and a cathode terminal connected to the output terminal of the switching element, the rectifier diode supplying the LED light source with counter electromotive force developed in the choke coil;
   a control circuit which outputs a drive signal that controls on and off operation of the switching element, based on an operation reference voltage which is a voltage at a same potential as a node between the output terminal of the switching element and the cathode terminal of the rectifier diode;
   a feedback sensing circuit connected to the output current sensing circuit, for receiving an output feedback signal output from the output current sensing circuit;
   an input voltage sensing circuit which senses input voltage information rectified by the rectifying circuit; and
   a conduction time counting circuit which counts a switching grant period signal output from the input voltage sensing circuit, wherein
   the feedback sensing circuit outputs a feedback dummy current to the output current sensing circuit,
   the conduction time counting circuit adjusts the feedback dummy current to be output from the feedback sensing circuit, depending on the counted switching grant period signal, and
   the feedback sensing circuit outputs to the control circuit a control signal which controls switching of the switching element in response to a signal based on an error between the output feedback signal and a feedback dummy signal generated from the feedback dummy current.

2. The light-emitting diode driving apparatus according to claim 1, further comprising
   a phase control dimmer between the AC power source and the rectifying circuit, which controls an alternating conduction angle to control a phase of a voltage to be output to the rectifying circuit.

3. The light-emitting diode driving apparatus according to claim 1, wherein
   the output current sensing circuit includes:
   a first resistor connected to the output terminal of the switching element and the one end of the choke coil;

a second resistor connected to the one end of the choke coil and a feedback sensing terminal of the feedback sensing circuit through which the feedback dummy current is output; and a capacitor connected between the output terminal of the switching element and the feedback sensing terminal of the feedback sensing circuit, wherein the output feedback signal is a first potential difference existing across the first resistor due to the current through the choke coil, the feedback dummy signal is a second potential difference existing across the second resistor due to the feedback dummy current, the feedback sensing circuit includes:

an adjustable current source which supplies the feedback dummy current;

an error amplifier which compares a voltage generated between the feedback sensing terminal and an operation reference terminal of the control circuit, due to a voltage difference between the first potential difference and the second potential difference, with a reference voltage; and a control signal converter which generates the control signal that controls the switching of the switching element, based on an output signal from the error amplifier, and if the voltage generated between the feedback sensing terminal and the operation reference terminal of the control circuit due to the voltage difference between the first potential difference and the second potential difference is higher than the reference voltage of the error amplifier, the control circuit provides control to substantially increase energy output to the LED light source in response to the control signal from the control signal converter, and if the voltage generated between the feedback sensing terminal and the operation reference terminal of the control circuit due to the voltage difference between the first potential difference and the second potential difference is lower than the reference voltage of the error amplifier, the control circuit provides control to substantially decrease the energy output to the LED light source in response to the control signal from the control signal converter.

4. The light-emitting diode driving apparatus according to claim 3, wherein the reference voltage of the error amplifier is substantially equal to the operation reference voltage of the control circuit.

5. The light-emitting diode driving apparatus according to claim 1, wherein the input voltage sensing circuit includes a sample-and-hold circuit which samples the input voltage information as a sampling signal in an off-period in the on and off operation of the switching element, and holds the sampling signal during an on-period in the on and off operation of the switching element.

6. The light-emitting diode driving apparatus according to claim 1, wherein the input voltage sensing circuit includes a sample-and-hold circuit which samples the input voltage information as a sampling signal in a preset sampling period which is after the switching element is turned off in the on and off operation, and holds the sampling signal after the preset sampling period.

7. The light-emitting diode driving apparatus according to claim 5, wherein the input voltage sensing circuit further includes:

a comparator which outputs to the control circuit and the conduction time counting circuit the switching grant period signal which grants the switching of the switching element if the sampling signal is at or above a first reference level which is preset, and prohibits the switching of the switching element if the sampling signal is below a hysteresis value of the first reference level; and a peak current sensed value converter which outputs to the control circuit a signal which changes, if the sampling signal is at or above the first reference level which is preset, a sensed value of a peak current through the switching element at a preset rate in response to a level of the sampling signal, and holds the sensed value of the peak current to a preset upper limit, when the sensed value of the peak current reaches the preset upper limit.

8. The light-emitting diode driving apparatus according to claim 1, wherein the conduction time counting circuit:

includes a charging and discharging circuit;

charges the charging and discharging circuit if the switching grant period signal from the input voltage sensing circuit is a grant signal, and adjusts the feedback dummy current to be output from the feedback sensing circuit depending on a charged voltage level; and discharges the charging and discharging circuit if the switching grant period signal is a prohibit signal, and sets the feedback dummy current to be output from the feedback sensing circuit to a zero level.

9. The light-emitting diode driving apparatus according to claim 1, wherein the conduction time counting circuit includes an oscillator circuit having a preset frequency, and a counter, and operates the oscillator circuit to apply periodic clock signals to the counter if the switching grant period signal from the input voltage sensing circuit is a grant signal, the counter adjusts the feedback dummy current to be output from the feedback sensing circuit, depending on the number of periodic clock signals applied to the counter, and the conduction time counting circuit stops the oscillator circuit, resets the counter, and sets the feedback dummy current to be output from the feedback sensing circuit to a zero level if the switching grant period signal is a prohibit signal.

10. The light-emitting diode driving apparatus according to claim 8, wherein the conduction time counting circuit further includes a clamping circuit, the clamping circuit holds the feedback dummy current from the feedback sensing circuit to a preset lower limit if a period where the switching grant period signal from the input voltage sensing circuit is the grant signal is less than or equal to a threshold indicating a first preset time, and holds the feedback dummy current from the feedback sensing circuit to a preset upper limit if the period where the switching grant period signal from the input voltage sensing circuit is the grant signal is greater than or equal to a threshold indicating a second preset time.

11. The light-emitting diode driving apparatus according to claim 10, wherein the threshold, set by the clamping circuit, indicating the second preset time is less than or equal to 7 ms.

12. The light-emitting diode driving apparatus according to claim 1, wherein the feedback dummy current adjusted by counting the period, in a certain input half-cycle, where the switching grant period signal output from the input voltage sensing circuit is a grant signal, is applied as the feedback dummy current to be output from the feedback sensing circuit, when the switching grant period signal is output in a next input half-cycle, and a value of the feedback dummy current is held during the next input half-cycle.

13. The light-emitting diode driving apparatus according to claim 3, wherein the control circuit controls a switching frequency of the switching element, using the control signal from the control signal converter of the feedback sensing circuit.

14. The light-emitting diode driving apparatus according to claim 3, wherein the control circuit controls an on-time of the switching element which operates at a certain frequency, using the control signal from the control signal converter of the feedback sensing circuit.

15. The light-emitting diode driving apparatus according to claim 3, wherein the control circuit controls a sensed value of a peak current through the switching element which operates at a certain frequency, using the control signal from the control signal converter of the feedback sensing circuit.

16. The light-emitting diode driving apparatus according to claim 13, wherein the input voltage sensing circuit outputs to the control circuit a signal which controls a sensed value of a peak current through the switching element, based on the input voltage information rectified by the rectifying circuit, and the control circuit controls a sensed value of a peak current through the switching element so that an input current generated due to the switching of the switching element is substantially proportional to the input voltage information rectified by the rectifying circuit.

17. The light-emitting diode driving apparatus according to claim 13, wherein the input voltage sensing circuit outputs to the control circuit a signal which controls an on-time of the switching element, based on the input voltage information rectified by the rectifying circuit, and the control circuit controls a sensed value of a peak current through the switching element so that an input current generated due to the switching of the switching element is substantially proportional to the input voltage information rectified by the rectifying circuit.

18. The light-emitting diode driving apparatus according to claim 1, wherein the input voltage sensing circuit outputs to the control circuit a signal which sets a sensed value of a peak current through the switching element to a desired value smaller than a preset upper limit during a certain time period after a grant signal, which is the switching grant period signal, is output, the certain time period being preset.

19. The light-emitting diode driving apparatus according to claim 1, wherein the input voltage sensing circuit outputs to the control circuit a signal which sets a switching frequency of the switching element to a desired value smaller than a preset upper limit during a certain time period after a grant signal, which is the switching grant period signal, is output, the certain time period being preset.

20. The light-emitting diode driving apparatus according to claim 18, wherein the control circuit includes:

a constant current source having one end connected to the high side of the rectifying circuit; and a regulator connected to another end of the constant current source, which outputs an activation signal if an output voltage of the constant current source is greater than or equal to a predetermined value, and outputs a deactivation signal if the output voltage of the constant current source is less than the predetermined value, and during a period in which the regulator outputs the activation signal, the conduction time counting circuit fixes the feedback dummy current to be output from the feedback sensing circuit to the preset upper limit if a period where the switching grant period signal is the grant signal is greater than or equal to a threshold indicating a third preset time.

21. A semiconductor device for use in the light-emitting diode driving apparatus according to claim 1, the semiconductor device comprising at least the switching element, the control circuit, the feedback sensing circuit, the input voltage sensing circuit, and the conduction time counting circuit formed on a same semiconductor substrate or incorporated in a same package.

22. A light-emitting diode driving apparatus comprising:

the semiconductor device according to claim 21; and a base connected to one of the AC power source and a DC power source, the base having a cylindrical shape, wherein the rectifying circuit, the LED light source which includes the one or more light-emitting diodes, the choke coil, the rectifier diode which supplies the LED light source with the counter electromotive force developed in the choke coil, and the semiconductor device are integrated within a housing, and an input of the rectifying circuit is connected to the base.

23. The light-emitting diode driving apparatus according to claim 1, further comprising a base connected to one of the AC power source and a DC power source, the base having a cylindrical shape, wherein an input of the rectifying circuit is connected to the base, and the rectifying circuit, the LED light source which includes the one or more light-emitting diodes, the choke coil, and the rectifier diode which supplies the LED light source with the counter electromotive force developed in the choke coil are integrated within a housing.

24. A light-emitting diode driving apparatus comprising:

a rectifying circuit which rectifies an AC voltage input from an AC power source, to output a DC voltage;

a load which includes an LED light source which includes one or more light-emitting diodes;

an energy conversion circuit coupled to a high side of the rectifying circuit and the load;

a switching element having an input terminal connected to a primary side of the energy conversion circuit and an output terminal connected to a low side of the rectifying circuit, the switching element turning on and off the DC voltage;

a control circuit which outputs a drive signal that controls on and off operation of the switching element, based on an operation reference voltage which is a voltage on the low side of the rectifying circuit;

an output current sensing circuit connected to the load and a low side of a secondary side of the energy conversion circuit, for sensing a current through the load;

a feedback sensing circuit connected to the output current sensing circuit, for receiving an output feedback signal output from the output current sensing circuit;

an input voltage sensing circuit which senses input voltage information rectified by the rectifying circuit;

a conduction time counting circuit which counts a switching grant period signal output from the input voltage sensing circuit; and a phase control dimmer between the AC power source and the rectifying circuit, which controls an alternating conduction angle to control a phase of a voltage to be output to the rectifying circuit, wherein the feedback sensing circuit outputs a feedback dummy current to the output current sensing circuit, the conduction time counting circuit adjusts the feedback dummy current to be output from the feedback sensing circuit, depending on the counted switching grant period signal, and the feedback sensing circuit outputs to the control circuit a control signal which controls switching of the switching element in response to a signal based on an error between the output feedback signal and a feedback dummy signal generated from the feedback dummy current.

* * * * *